(12) United States Patent
Northrup et al.

(10) Patent No.: US 10,405,623 B2
(45) Date of Patent: *Sep. 10, 2019

(54) PROTECTIVE ENCLOSURE FOR AN ELECTRONIC DEVICE

(71) Applicant: OTTER PRODUCTS, LLC, Fort Collins, CO (US)

(72) Inventors: Nathan Northrup, Fort Collins, CO (US); Kevin W. Witter, Fort Collins, CO (US); James M. Prestien, Loveland, CO (US); David C. Russell, Fort Collins, CO (US); Erika E. Johnson, Fort Collins, CO (US); Matthew S. Krajec, Loveland, CO (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,194

(22) Filed: Jan. 9, 2019

(65) Prior Publication Data

US 2019/0159562 A1 May 30, 2019

Related U.S. Application Data

(63) Continuation of application No. 16/156,135, filed on Oct. 10, 2018, now Pat. No. 10,206,472, which is a
(Continued)

(51) Int. Cl.
*A45C 11/24* (2006.01)
*A45C 13/00* (2006.01)
(Continued)

(52) U.S. Cl.
CPC .............. *A45C 11/24* (2013.01); *A45C 11/00* (2013.01); *A45C 13/001* (2013.01); *A45C 13/04* (2013.01);
(Continued)

(58) Field of Classification Search
CPC .............. A45C 11/00; A45C 2011/002; A45C 2011/003; A45C 2011/001; A45C 11/24;
(Continued)

(56) References Cited

U.S. PATENT DOCUMENTS 3,023,885 A 3/1962 Kindseth
3,480,310 A 11/1969 Mcelwain
(Continued)

FOREIGN PATENT DOCUMENTS

CN 202488509 U 10/2012
FR 935529 A 6/1948
(Continued)

OTHER PUBLICATIONS

Outfityours.com (Top 5 Best Clear iPhone 5S and iPhone 5 Cases—Incase, Otterbox, Griffin, Moshi [retrieved from https://www.youtube.com/watch?v=rWYKJvsDHPw],YouTube.com [online], May 17, 2013 [retrieved Oct. 11, 2017], 3 pages.
(Continued)

*Primary Examiner* — Margaret G Mastrodonato

(57) ABSTRACT

A protective enclosure for an electronic device includes a structural member and a cushioning member permanently attached to the structural member. The structural member has a back portion with an inner surface and an outer surface. The structural member includes a cavity configured to extend between the inner surface of the back portion and the installed electronic device. The cushioning member has a top section configured to be in direct contact with and cover at least a portion of a front surface of the installed electronic device, a bottom section configured to be in direct contact with and cover at least a portion of the back surface of the installed electronic device, and one or more side sections each configured to cover a respective side of the plurality of side surfaces of the installed electronic device. The bottom
(Continued)

section of the cushioning member at least partially bounds the first cavity of the structural member.

18 Claims, 9 Drawing Sheets

Related U.S. Application Data continuation of application No. 15/967,053, filed on Apr. 30, 2018, now Pat. No. 10,136,716, which is a continuation of application No. 15/080,082, filed on Mar. 24, 2016, now Pat. No. 9,986,805.

(60) Provisional application No. 62/139,914, filed on Mar. 30, 2015.

(51) Int. Cl.
*A45C 13/04* (2006.01)
*H04B 1/3888* (2015.01)
*H04M 1/18* (2006.01)
*A45C 11/00* (2006.01)

(52) U.S. Cl.
CPC .......... *H04B 1/3888* (2013.01); *H04M 1/185* (2013.01); *A45C 2011/001* (2013.01); *A45C 2011/002* (2013.01); *A45C 2011/003* (2013.01); *A45C 2200/10* (2013.01)

(58) Field of Classification Search
CPC .. A45C 2200/10; A45C 13/004; A45C 13/001
See application file for complete search history.

(56) References Cited

U.S. PATENT DOCUMENTS

| | | |
|---|---|---|
| 3,521,216 A | 7/1970 | Tolegian |
| 3,786,391 A | 1/1974 | Mathauser |
| 3,808,577 A | 4/1974 | Mathauser |
| 3,810,258 A | 5/1974 | Mathauser |
| 3,816,679 A | 6/1974 | Hotchkiss |
| 4,029,999 A | 6/1977 | Neumann et al. |
| 4,097,878 A | 6/1978 | Cramer |
| 4,182,558 A | 1/1980 | Matsuo |
| 4,431,333 A | 2/1984 | Chandler |
| 4,584,718 A | 4/1986 | Fuller |
| 4,859,110 A | 8/1989 | Dommel |
| 4,940,414 A | 7/1990 | Lee |
| 4,963,902 A | 10/1990 | Fukahori |
| 4,994,829 A | 2/1991 | Tsukamoto |
| 5,025,921 A | 6/1991 | Gasparaitis et al. |
| 5,054,733 A | 10/1991 | Shields |
| 5,123,044 A | 6/1992 | Tate |
| 5,138,523 A | 8/1992 | Benck et al. |
| 5,359,756 A | 11/1994 | Miyauchi et al. |
| 5,360,108 A | 11/1994 | Alagia |
| 5,368,159 A | 11/1994 | Doria |
| 5,380,968 A | 1/1995 | Morse |
| 5,383,091 A | 1/1995 | Snell |
| 5,386,084 A | 1/1995 | Risko |
| 5,388,691 A | 2/1995 | White |
| 5,388,692 A | 2/1995 | Withrow et al. |
| D365,927 S | 1/1996 | Cho |
| 5,508,479 A | 4/1996 | Schooley |
| 5,541,813 A | 7/1996 | Satoh et al. |
| 5,604,050 A | 2/1997 | Brunette et al. |
| 5,664,292 A | 9/1997 | Chen |
| 5,671,120 A | 9/1997 | Kikinisi |
| 5,992,807 A | 11/1999 | Tarulli |
| 5,996,956 A | 12/1999 | Shawver |
| 6,115,248 A | 9/2000 | Canova et al. |
| 6,135,408 A | 10/2000 | Richter |
| 6,149,116 A | 11/2000 | Won |
| 6,302,617 B1 | 10/2001 | Rumpp |
| 6,305,588 B1 | 10/2001 | Michel et al. |
| 6,305,656 B1 | 10/2001 | Wemyss |
| 6,311,017 B1 | 10/2001 | Mori |
| 6,317,313 B1 | 11/2001 | Mosgrove et al. |
| 6,349,824 B1 | 2/2002 | Yamada |
| 6,375,009 B1 | 4/2002 | Lee |
| 6,409,531 B1 | 6/2002 | Millard |
| 6,445,577 B1 | 9/2002 | Madsen et al. |
| 6,456,487 B1 | 9/2002 | Hetterick |
| 6,464,524 B1 | 10/2002 | Kerr et al. |
| 6,490,155 B2 | 12/2002 | Han et al. |
| 6,514,624 B2 | 2/2003 | Takemoto |
| 6,545,862 B1 | 4/2003 | Gettemy et al. |
| 6,616,111 B1 | 9/2003 | White |
| 6,625,394 B2 | 9/2003 | Smith et al. |
| 6,626,362 B1 | 9/2003 | Steiner et al. |
| 6,646,864 B2 | 11/2003 | Richardson |
| 6,685,493 B2 | 2/2004 | Birkenmaier et al. |
| 6,701,159 B1 | 3/2004 | Powell |
| 6,705,580 B1 | 3/2004 | Bain |
| 6,762,935 B2 | 7/2004 | Hidewasa |
| 6,865,076 B2 | 3/2005 | Lunsford |
| 6,888,940 B1 | 5/2005 | Deppen |
| 6,966,519 B2 | 11/2005 | Salentine et al. |
| 7,050,841 B1 | 5/2006 | Onda |
| 7,072,699 B2 | 7/2006 | Eiden |
| D526,780 S | 8/2006 | Richardson et al. |
| 7,158,376 B2 | 1/2007 | Richardson et al. |
| 7,180,735 B2 | 2/2007 | Thomas et al. |
| 7,194,291 B2 | 3/2007 | Peng |
| D542,524 S | 5/2007 | Richardson et al. |
| 7,230,823 B2 | 6/2007 | Richardson et al. |
| 7,236,588 B2 | 6/2007 | Gartrell |
| 7,287,738 B2 | 10/2007 | Pitlor |
| 7,311,526 B2 | 12/2007 | Rohrbach et al. |
| 7,343,184 B2 | 3/2008 | Rostami |
| 7,359,184 B2 | 4/2008 | Lord |
| 7,374,142 B2 | 5/2008 | Carnevali |
| D574,819 S | 8/2008 | Andre et al. |
| 7,431,251 B2 | 10/2008 | Carnevali |
| D581,155 S | 11/2008 | Richardson et al. |
| D581,421 S | 11/2008 | Richardson et al. |
| D587,008 S | 2/2009 | Richardson et al. |
| D589,016 S | 3/2009 | Richardson et al. |
| 7,555,325 B2 | 6/2009 | Goros |
| 7,558,594 B2 | 7/2009 | Wilson |
| 7,575,389 B2 | 8/2009 | Nance |
| 7,688,580 B2 | 3/2010 | Richardson et al. |
| 7,871,218 B2 | 1/2011 | Frey et al. |
| 7,889,489 B2 | 2/2011 | Richardson et al. |
| 7,907,394 B2 | 3/2011 | Richardson et al. |
| 7,933,122 B2 | 4/2011 | Richardson et al. |
| 8,016,107 B2 | 9/2011 | Emsky |
| 8,049,727 B2 | 11/2011 | Hanson et al. |
| 8,204,561 B2 | 6/2012 | Mongan et al. |
| 8,303,336 B2 | 11/2012 | Smith |
| 8,442,604 B1 | 5/2013 | Diebel |
| 8,453,344 B2 | 6/2013 | Nishiwaki et al. |
| 8,453,835 B2 | 6/2013 | So |
| 8,457,701 B2 | 6/2013 | Diebel |
| 8,490,783 B1 | 7/2013 | Fan |
| 8,509,865 B1 | 8/2013 | LaColla et al. |
| 8,514,568 B2 | 8/2013 | Qiao et al. |
| 8,560,031 B2 | 10/2013 | Barnett et al. |
| 8,567,599 B2 | 10/2013 | Beatty et al. |
| 8,599,547 B2 | 12/2013 | Richardson et al. |
| 8,608,502 B2 | 12/2013 | Witter et al. |
| 8,646,739 B2 | 2/2014 | Moyer |
| 8,676,281 B1 | 3/2014 | Caulder et al. |
| 8,706,175 B2 | 4/2014 | Cho |
| 8,755,852 B2 | 6/2014 | Hynecek et al. |
| 8,770,402 B2 | 7/2014 | Bergreen et al. |
| 8,777,002 B2 | 7/2014 | Thomas et al. |
| 8,798,675 B2 | 8/2014 | Salmon et al. |
| 8,800,762 B2 | 8/2014 | Fathollahi |
| 8,830,663 B2 | 9/2014 | Child et al. |
| 8,875,879 B2 | 11/2014 | Diebel et al. |
| D722,603 S | 2/2015 | Lay et al. |
| 8,955,678 B2 | 2/2015 | Murphy et al. |
| 8,965,458 B2 | 2/2015 | Richardson et al. |

(56) References Cited

U.S. PATENT DOCUMENTS

| | | |
|---|---|---|
| D725,119 S | 3/2015 | Gaylord |
| D726,732 S | 4/2015 | Lay et al. |
| 9,008,738 B1 | 4/2015 | Dong |
| 9,060,580 B2 | 6/2015 | Tages |
| 9,089,056 B2 | 7/2015 | Rayner |
| 9,098,238 B2 | 8/2015 | Richardson et al. |
| D739,857 S | 9/2015 | Lay et al. |
| 9,125,297 B2 | 9/2015 | Magness |
| 9,136,897 B2 | 9/2015 | Hynecek et al. |
| 9,266,664 B2 | 2/2016 | Bau |
| 9,295,174 B2 | 3/2016 | Witter et al. |
| 9,316,026 B2 | 4/2016 | Myers et al. |
| 9,367,090 B2 | 6/2016 | Barnett et al. |
| 9,397,719 B1 | 7/2016 | Schmidt |
| 9,408,448 B2 | 8/2016 | Kay et al. |
| D766,226 S | 9/2016 | Wu |
| D766,227 S | 9/2016 | Wu |
| D769,855 S | 10/2016 | Deng |
| 9,462,099 B2 | 10/2016 | Wilson et al. |
| 9,481,490 B2 | 11/2016 | Venida et al. |
| 9,487,376 B2 | 11/2016 | Salentine et al. |
| 9,503,147 B2 | 11/2016 | Witter et al. |
| D775,115 S | 12/2016 | Ormsbee et al. |
| 9,537,526 B2 | 1/2017 | Wilson et al. |
| 9,545,140 B1 | 1/2017 | Johnson et al. |
| 9,615,476 B2 | 4/2017 | Rayner et al. |
| 9,622,556 B2 | 4/2017 | Fathollahi et al. |
| 9,654,605 B2 | 5/2017 | Goldfain et al. |
| 9,660,684 B2 | 5/2017 | Rayner |
| 9,743,540 B2 | 8/2017 | Magness |
| 9,765,921 B2 | 9/2017 | Vogel et al. |
| 9,774,713 B2 | 9/2017 | Guerdrum et al. |
| D799,469 S | 10/2017 | Esses |
| 9,788,620 B1 | 10/2017 | Parkinson |
| 9,800,283 B2 | 10/2017 | Schmidt |
| 9,807,211 B2 | 10/2017 | Guerdrum et al. |
| D808,376 S | 1/2018 | Kim |
| D808,377 S | 1/2018 | Witter et al. |
| 9,871,550 B2 | 1/2018 | Witter et al. |
| 9,913,388 B1 | 3/2018 | Mchatet |
| 10,027,783 B2 | 7/2018 | Dukerschein et al. |
| 2001/0000617 A1 | 5/2001 | Tracy |
| 2002/0065054 A1 | 5/2002 | Humphreys et al. |
| 2002/0079244 A1 | 6/2002 | Kwong |
| 2003/0141329 A1 | 7/2003 | Huang |
| 2004/0029405 A1 | 2/2004 | Neidlein |
| 2005/0088811 A1 | 4/2005 | Ulla et al. |
| 2005/0224508 A1 | 10/2005 | Tajiri et al. |
| 2005/0279661 A1 | 12/2005 | Hodges |
| 2005/0284904 A1 | 12/2005 | Knapp et al. |
| 2006/0086873 A1 | 4/2006 | Chen |
| 2006/0172765 A1 | 8/2006 | Lev |
| 2006/0237495 A1 | 10/2006 | Chen et al. |
| 2006/0255493 A1 | 11/2006 | Fouladpour |
| 2007/0071423 A1 | 3/2007 | Fantone et al. |
| 2007/0115387 A1 | 5/2007 | Ho |
| 2007/0146985 A1 | 6/2007 | Mick et al. |
| 2007/0155448 A1 | 7/2007 | Hong |
| 2007/0158220 A1 | 7/2007 | Cleereman et al. |
| 2007/0215659 A1 | 9/2007 | Knapp et al. |
| 2007/0215769 A1 | 9/2007 | Nebeker et al. |
| 2007/0297149 A1 | 12/2007 | Richardson et al. |
| 2008/0163463 A1 | 7/2008 | Hulden |
| 2008/0199252 A1 | 8/2008 | Frey et al. |
| 2009/0034169 A1 | 2/2009 | Richardson et al. |
| 2009/0084705 A1 | 4/2009 | Justiss |
| 2009/0237377 A1 | 9/2009 | Lai et al. |
| 2009/0283184 A1 | 11/2009 | Han |
| 2010/0006468 A1 | 1/2010 | Lin |
| 2010/0078343 A1 | 4/2010 | Hoellwarth et al. |
| 2010/0093412 A1 | 4/2010 | Serra et al. |
| 2010/0122756 A1 | 5/2010 | Longinotti-Buitoni |
| 2010/0147737 A1 | 6/2010 | Richardson et al. |
| 2010/0181450 A1 | 7/2010 | Hulick et al. |
| 2010/0203931 A1 | 8/2010 | Hynecek et al. |
| 2010/0230301 A1 | 9/2010 | Fellig |
| 2011/0031287 A1 | 2/2011 | Gette et al. |
| 2011/0064401 A1 | 3/2011 | DeSorbo |
| 2011/0073505 A1 | 3/2011 | Stiehl |
| 2011/0073608 A1 | 3/2011 | Richardson et al. |
| 2011/0101058 A1 | 5/2011 | Heckman |
| 2011/0192857 A1 | 8/2011 | Rothbaum et al. |
| 2011/0228459 A1 | 9/2011 | Richardson et al. |
| 2011/0294556 A1 | 12/2011 | Carlberg et al. |
| 2011/0297566 A1 | 12/2011 | Gallagher et al. |
| 2011/0314651 A1 | 12/2011 | Behar et al. |
| 2012/0018325 A1 | 1/2012 | Kim |
| 2012/0031788 A1 | 2/2012 | Mongan |
| 2012/0037524 A1 | 2/2012 | Thomas et al. |
| 2012/0037536 A1 | 2/2012 | Thomas et al. |
| 2012/0043235 A1 | 2/2012 | Klement |
| 2012/0074005 A1 | 3/2012 | Johnson et al. |
| 2012/0092377 A1 | 4/2012 | Stein |
| 2012/0111881 A1 | 5/2012 | Gaddis et al. |
| 2012/0175474 A1 | 7/2012 | Barnard et al. |
| 2012/0187260 A1 | 7/2012 | Moyer |
| 2012/0252543 A1 | 10/2012 | Cho |
| 2012/0267491 A1 | 10/2012 | Chiu |
| 2012/0287565 A1 | 11/2012 | Bennett |
| 2012/0325702 A1 | 12/2012 | Gallagher et al. |
| 2012/0326003 A1 | 12/2012 | Solow et al. |
| 2013/0027862 A1 | 1/2013 | Rayner |
| 2013/0068915 A1 | 3/2013 | Yang |
| 2013/0088813 A1 | 4/2013 | Su et al. |
| 2013/0098788 A1 | 4/2013 | McCarville et al. |
| 2013/0126533 A1 | 5/2013 | Klosky |
| 2013/0175186 A1 | 7/2013 | Simmer |
| 2013/0181584 A1 | 7/2013 | Whitten et al. |
| 2013/0220841 A1 | 8/2013 | Yang |
| 2013/0220847 A1 | 8/2013 | Fisher et al. |
| 2013/0240578 A1 | 9/2013 | Yu |
| 2013/0292269 A1 | 11/2013 | Tages |
| 2013/0292288 A1 | 11/2013 | Willes |
| 2013/0303000 A1 | 11/2013 | Witter et al. |
| 2013/0318775 A1 | 12/2013 | Peters |
| 2014/0049142 A1 | 2/2014 | Magness |
| 2014/0065847 A1 | 3/2014 | Salmon et al. |
| 2014/0080553 A1 | 3/2014 | Torset et al. |
| 2014/0097102 A1 | 4/2014 | Piatt et al. |
| 2014/0099526 A1 | 4/2014 | Powell et al. |
| 2014/0128132 A1 | 5/2014 | Cox |
| 2014/0152890 A1 | 6/2014 | Rayner |
| 2014/0166707 A1 | 6/2014 | Leisey-Bartsch |
| 2014/0183064 A1 | 7/2014 | Ge |
| 2014/0183065 A1 | 7/2014 | Toulotte |
| 2014/0187289 A1 | 7/2014 | Cataldo et al. |
| 2014/0227026 A1 | 8/2014 | O'Neill et al. |
| 2014/0228074 A1 | 8/2014 | Kulkarni et al. |
| 2014/0262848 A1 | 9/2014 | Fathollahi et al. |
| 2014/0262934 A1 | 9/2014 | Fathollahi et al. |
| 2014/0265765 A1 | 9/2014 | Khodapanah et al. |
| 2014/0265767 A1 | 9/2014 | Fathollahi |
| 2014/0299488 A1 | 10/2014 | Andrew |
| 2014/0302896 A1 | 10/2014 | Xu et al. |
| 2014/0325818 A1 | 11/2014 | Mayfield |
| 2014/0355200 A1 | 12/2014 | Thiers |
| 2015/0061477 A1 | 3/2015 | Wilson |
| 2015/0062787 A1 | 3/2015 | Wilson et al. |
| 2015/0068935 A1 | 3/2015 | Kay et al. |
| 2015/0083615 A1 | 3/2015 | Lay et al. |
| 2015/0111623 A1 | 4/2015 | Hegemier et al. |
| 2015/0133183 A1 | 5/2015 | Alameh et al. |
| 2015/0141090 A1 | 5/2015 | Hwan et al. |
| 2015/0141095 A1 | 5/2015 | Kim |
| 2015/0153791 A1 | 6/2015 | Wong |
| 2015/0172431 A1 | 6/2015 | Huang |
| 2015/0194997 A1 | 7/2015 | Johnson et al. |
| 2015/0194998 A1 | 7/2015 | Fathollahi |
| 2015/0195938 A1 | 7/2015 | Witter et al. |
| 2015/0201723 A1 | 7/2015 | Rayner et al. |
| 2015/0220766 A1 | 8/2015 | Russell et al. |
| 2015/0257285 A1 | 9/2015 | Wilson et al. |
| 2015/0257287 A1 | 9/2015 | Tages |
| 2016/0007705 A1 | 1/2016 | Liebers et al. |

(56) References Cited

U.S. PATENT DOCUMENTS

| | | |
|---|---|---|
| 2016/0040825 A1 | 2/2016 | Franklin |
| 2016/0072933 A1 | 3/2016 | Cox |
| 2016/0080024 A1 | 3/2016 | Wilson et al. |
| 2016/0122821 A1 | 5/2016 | Liu et al. |
| 2016/0142093 A1 | 5/2016 | Phang |
| 2016/0150861 A1 | 6/2016 | Yao et al. |
| 2016/0164565 A1 | 6/2016 | Witter et al. |
| 2016/0254836 A1 | 9/2016 | Alsberg et al. |
| 2016/0261133 A1 | 9/2016 | Wang |
| 2016/0286920 A1 | 10/2016 | Lean et al. |
| 2016/0286921 A1 | 10/2016 | Northrup et al. |
| 2016/0295981 A1 | 10/2016 | Lay et al. |
| 2016/0347257 A1 | 12/2016 | Buchanan |
| 2017/0026498 A1 | 1/2017 | Goldfain et al. |
| 2017/0041037 A1 | 2/2017 | Witter et al. |
| 2017/0099922 A1 | 4/2017 | Guerdrum et al. |
| 2017/0099924 A1 | 4/2017 | Fathollahi et al. |
| 2017/0119120 A1 | 5/2017 | Richardson et al. |
| 2017/0237460 A1 | 8/2017 | Rayner |
| 2017/0279478 A1 | 9/2017 | Fathollahi |
| 2017/0353208 A1 | 12/2017 | Wilson et al. |

FOREIGN PATENT DOCUMENTS

| | | |
|---|---|---|
| KR | 200446444 | 10/2009 |
| KR | 101394285 | 5/2014 |
| WO | 1994000037 A1 | 1/1994 |
| WO | 1999041958 A1 | 8/1999 |
| WO | 2015103599 A1 | 7/2015 |

OTHER PUBLICATIONS

Randomrazr (New Otterbox Symmetry Case—The Slim Protective Case for the iPhone 5S/5C [retrieved from https://wwwyoutube.com/watch?v=zGWZTGamuT0], YouTube.com [online], Mar. 30, 2014 [retrieved Oct. 11, 2017]), 5 pages.

PROTECTIVE ENCLOSURE FOR AN ELECTRONIC DEVICE

CROSS REFERENCE TO RELATED APPLICATIONS

This application is a continuation of U.S. patent application Ser. No. 16/156,135, filed Oct. 10, 2018, which is a continuation of U.S. patent application Ser. No. 15/967,053, filed Apr. 30, 2018, which is a continuation of U.S. patent application Ser. No. 15/080,082, filed Mar. 24, 2016, which claims the benefit of U.S. Provisional Patent Application No. 62/139,914, filed Mar. 30, 2015, the disclosures of which are hereby incorporated by reference in their entirety.

BACKGROUND

Many types of electronic devices are used for communication and entertainment purposes. These devices include computers, tablets, audio players, video players, smartphones, two-way radios, and GPS receivers. These devices often include touch screens, scroll wheels, switches, or other interactive controls. Due to the sensitive nature and high cost of these electronic devices, it is desirable to protect these devices from physical damage that can result from everyday usage.

Many two-piece and three-piece protective enclosures exist and provide cushion and structural layers for electronic device protection. However, many of these enclosures require a user to follow a relatively complicated set of instructions to assemble the multi-piece protective enclosure around the electronic device. These multiple layers can also have multiple steps of assembly or to replace and manage if removing the electronic device from the protective enclosure. To avoid assembly and removable steps, it is desirable to provide a one-piece protective enclosure that provides easy installation and removal and equal or superior protective benefits as the multi-piece protective solutions.

The various types of electronic devices are now becoming more fashionable and not only functional for the consumer. Consumers are desiring protection for their electronic device and the ability to still see their electronic device while the protective enclosure is installed on the electronic device. It is therefore desirable to not only protect these devices from everyday usage but also allow for the style of the electronic device to show through a protective enclosure. Consumers are also desiring decorative protection that can show their style yet still protect their electronic device. It is therefore desirable to not only protect these devices from everyday usage but also allow for customizable and/or interchangeable decorative components.

SUMMARY

In one aspect, a protective enclosure for an electronic device is provided. The electronic device can be a device that needs protection from droppage, mishandling and/or damage. The electronic device can be a mobile phone or tablet computer. The electronic device can also be an audio player, a video player, a smartphone, a two-way radio, or a GPS receiver.

The electronic device can have a front surface. The front surface of the electronic device can comprise a touch screen, which can be a capacitive sensing touch screen or other type of interactive control panel. In other embodiments, the front surface of the electronic device can have a keyboard or buttons along with a touch screen or other display. The electronic device can have a back surface, and together with the front surface, the electronic device can be surrounded by a perimeter portion.

The electronic device can have side surfaces. The side surfaces can include a top surface, or top-side surface, a bottom surface, or bottom-side surface, and opposing side surfaces. The side surfaces along with the front surface and back surface provide the housing of the electronics, battery, and other components of the electronic device. The side surfaces, including the top surface and bottom surface, of the electronic device can have additional features of the electronic device, including buttons and controls and access points.

The electronic device can have buttons and controls that along with the screen make the electronic device function fully. The buttons on the electronic device can be a power button, can be volume controls, can be a silencing toggle, can be a headphone port, can be microphone, and in some instances the buttons can be a keyboard or other controls for enabling the electronic device to function.

The electronic device can have a camera. The camera can be located on a surface of the electronic device and in some instances can located on the back surface of the electronic device. The camera can include a flash and in some instances can be located on the back surface of the electronic device. In some instances, other features might be located near the camera of the electronic device, including a speaker, microphone, or other sensors. In other instances, the electronic device can have a second camera, sometimes located on the front surface of the electronic device. Other features might also be located near this second camera of the electronic device, including a speaker, microphone, or other sensors.

The electronic device can have a speaker. The speaker can be located on a surface of the electronic device and in some instances can be located along a perimeter surface of the electronic device and on a bottom surface of the electronic device. The speaker can be one speaker, or a combination of speakers spread across a surface of the electronic device. The electronic device can also have accessible areas for power connections and for headphone connections. These areas can be located along a surface of the electronic device and in some instances be located on the bottom surface or the top surface of the electronic device.

The electronic device can have a main button for assisting in controls on the touch screen. In some instances, this main button, sometimes called a home button, can be located on a peripheral area of the front surface of the electronic device, outside of the area of the interactive touch screen. The home button can be located along any portion of the touch screen on the front surface of the electronic device and in some instances the home button is located at the bottom portion of the touch screen.

The protective enclosure is configured such that the electronic device can fit within the protective enclosure and be protected from drops, shocks, damage, misuse, and the like. In certain instances, the protective enclosure can include a structural member. In certain instances, the structural member can have a back portion that extends along the back surface of an electronic device. In certain instances, the structural member can include side surfaces. The side surfaces can cover one or more sides of the electronic device. In some embodiments, the side surfaces can have a top side portion, a bottom side portion, a left side portion, and a right side portion. In other instances, the side surfaces of the structural member can have a combination of a top side portion and a right or left side, or a bottom side portion and a right or left side portion. And in other instances, the structural member can only have left and right side surfaces.

In one exemplary embodiment, a protective enclosure for an electronic device, the electronic device including a front surface, a back surface, and a plurality of side surfaces, is provided. The protective enclosure includes a structural member, a cushioning member permanently affixed to the structural member, and a cavity. The structural member has a back portion and a plurality of side portions. The back portion includes an inner surface configured to face the electronic device when the electronic device is installed in the protective enclosure and an outer surface. The cushioning member has a top section, a bottom section, and one or more side sections. The cushioning member includes an upper edge configured to extend beyond the front surface of the installed electronic device. The cushioning member further includes a protective rim configured to extend beyond the back surface of the electronic device and be in direct contact with a portion of the back surface of the electronic device when the electronic device is installed in the protective enclosure. The cavity is at least partially bounded by the protective rim of the cushioning member. The cavity is configured to extend between the inner surface of the structural member to the back surface of the installed electronic device.

In one exemplary embodiment, a one-piece protective enclosure for housing an electronic device, the electronic device including a front surface, a back surface, and a plurality of side surfaces, is provided. The one-piece protective enclosure includes a cushioning member and a structural member affixed to the cushioning member. The cushioning member defines a perimeter of the one-piece protective enclosure and is configured to cover the side surfaces of the electronic device when the electronic device is installed in the one-piece protective enclosure. The cushioning member has a first protective rim configured to extend beyond the front surface of the installed electronic device and a second protective rim configured to extend beyond the back surface of the electronic device and be in direct contact with the a portion of the back surface of the electronic device when the electronic device is installed in the one-piece protective enclosure. The structural member includes a back portion configured to cover the second protective rim. The back portion of the structural member further covers a gap at least partially bounded by the second protective rim and configured to extend from an inner surface of the structural member to the back surface of the installed electronic device when the electronic device is installed in the one-piece protective enclosure.

In one exemplary embodiment, a one-piece multi-layered case for an electronic device, the electronic device including a front surface, a back surface, and a plurality of side surfaces, is provided. The one-piece multi-layered case includes a cushioning layer, a structural layer permanently affixed to the cushioning layer, and a space formed in the cushioning layer. The cushioning layer is configured to cover and cushion the side surfaces of the electronic device, the cushioning layer having a protective rim extending beyond and configured to be in direct contact with a portion of the back surface of the electronic device when the electronic device is installed in the one-piece multi-layered case. The structural layer includes a back portion extending around the protective rim of the cushioning layer and configured to cover the back surface of the electronic device when the electronic device is installed in the one-piece multi-layered case. The space formed in the cushioning layer is at least partially bounded by the protective rim, the space extending from the structural layer to the back surface of the electronic device when the electronic device is installed in the one-piece multi-layered case.

In one exemplary embodiment, a protective enclosure for an electronic device including a front surface, a back surface, and a plurality of side surfaces is provided. The protective enclosure includes a structural member, a cushioning member permanently affixed to the structural member, and a cavity. The structural member has a back portion and a plurality of side portions. The back portion includes an inner surface and an outer surface opposite the inner surface. The cushioning member extends continuously from an upper edge to a lower edge. The upper edge of the cushioning member is configured to extend beyond the front surface of the electronic device when the electronic device is installed in the protective enclosure. The lower edge of the cushioning member is configured to extend beyond the back surface of the electronic device and be in direct contact with a portion of the back surface of the electronic device when the electronic device is installed in the protective enclosure. The cavity is configured to extend between the inner surface of the back portion of the structural member to the back surface of the installed electronic device, the cavity at least partially bounded by the lower edge of the cushioning member.

In one exemplary embodiment, a protective enclosure for an electronic device is provided, the electronic device having a front surface, a back surface, and a plurality of side surfaces, the front surface and side surfaces of the electronic device defining a front edge, and the back surface and side surfaces of the electronic device defining a back edge. The protective enclosure includes a bumper portion and a bottom shell permanently affixed to the bumper portion. The bumper portion extends between a first protective rim configured to extend above the front edge of the electronic device when the electronic device is installed in protective enclosure and an inner protective rim configured to extend behind the back edge of the electronic device and be in direct contact only with a portion of the back surface of the electronic device proximate the back edge when the electronic device is installed in the protective enclosure. The bottom shell has a back portion and a plurality of side portions, the back portion including an inner surface and an opposing outer surface. The protective enclosure is configured to define a gap extending between the inner surface of the bottom shell to the back surface of the installed electronic device, the gap configured to be at least partially bounded by the inner protective rim of the bumper portion.

In one exemplary embodiment, a protective enclosure for an electronic device is provided, the electronic device including a front surface, a back surface, and a plurality of side surfaces. The protective enclosure include an elastomeric cushioning member, a polymeric structural member, and a cavity. The elastomeric cushioning member includes a top section, a bottom section, and a plurality of side sections connecting the top section and the bottom section of the elastomeric cushioning member. The top section includes a raised beveled edge configured to extend beyond the front surface of the electronic device when the electronic device is installed in the protective enclosure. The bottom section includes a lower edge configured to extend beyond the back surface of the installed electronic device and be in direct contact with only a portion of the back surface of the installed electronic device. Each of the plurality of side sections is configured to cover a side surface of the plurality of side surfaces of the installed electronic device. The polymeric structural member has a back portion and a plurality of side portions, the back portion including an inner surface, the side portions at least partially covering the plurality of side sections of the elastomeric cushioning member. The cavity is at least partially bounded by the lower edge of the elastomeric cushioning member and the inner surface of the polymeric structural member.

In one exemplary embodiment, a protective enclosure for an electronic device is provided, the electronic device including a front surface, a back surface, and a plurality of side surfaces. The protective enclosure includes a structural member and a cushioning member permanently attached to the structural member. The structural member has a back portion having an inner surface and an outer surface. The structural member includes a first cavity configured to extend between the inner surface of the back portion and the electronic device when the electronic device is installed in the protective enclosure. The cushioning member includes a top section configured to be in direct contact with and cover at least a portion of the front surface of the installed electronic device, a bottom section configured to be in direct contact with and cover at least a portion of the back surface of the installed electronic device, and one or more side sections each configured to cover a respective side of the plurality of side surfaces of the installed electronic device. The bottom section of the cushioning member at least partially bounds the first cavity of the structural member.

In one exemplary embodiment, a protective enclosure for an electronic device is provided, the electronic device including a front surface with a display and a back surface opposite the front surface. The protective enclosure includes a cushioning member, a structural member permanently attached to the cushioning member, and a gap configured to extend between the inner surface of the structural member and the back surface of the installed electronic device. The cushioning member includes an upper edge configured to extend beyond the front surface of the installed electronic device to protect the display of the electronic device when the electronic device is installed in the protective enclosure and a lower edge configured to extend be in direct contact with an extend beyond the back surface of the installed electronic device. The structural member is configured to cover at least a portion of the back surface of the installed electronic device. The structural member includes a plurality of side portions and a back portion having an inner surface and an outer surface.

In one exemplary embodiment, a one-piece protective enclosure for an electronic device is provided, the electronic device including a front surface, a back surface, and a plurality of side surfaces. The one-piece protective enclosure includes a structural member, a cushioning member permanently attached to the structural member, a slot extending around at least a portion of a perimeter of the protective enclosure between the structural member and the cushioning member, and a gap configured to extend between the inner surface of the structural member and the back surface of the installed electronic device. The structural member is configured to cover at least a portion of the back surface of the installed electronic device. The structural member includes a back portion having an inner surface and an outer surface. The cushioning member includes a lower edge configured to be in direct contact with and extend beyond the back surface of the installed electronic device.

BRIEF DESCRIPTIONS OF DRAWINGS

DETAILED DESCRIPTION

Figure 1:
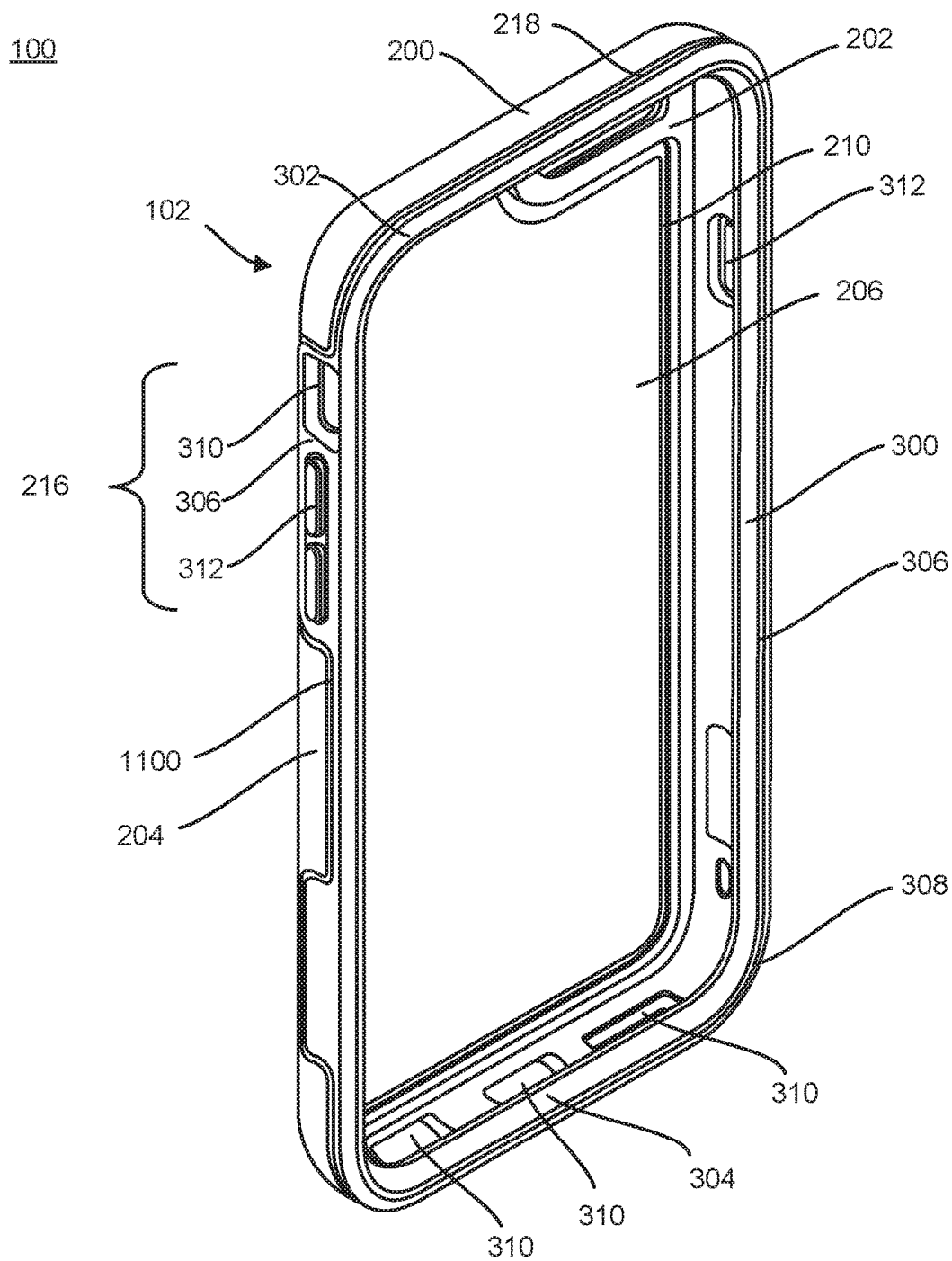
FIG. 1 is a front isometric view of a protective enclosure for an electronic device.

The subject matter described herein relates to a protective enclosure, case, or cover for an electronic device. It is desired to have the electronic device protected from adverse environmental conditions, mishandling, and/or damage from drops and falls. It is desirable that the protective enclosure for the electronic device be easy to install and it is desirable for the protective enclosure to have a transparent component for seeing an interchangeable decorative insert card within the one-piece enclosure. The protective enclosure can be of any appropriate size and dimension so long as it is capable of housing an electronic device and protecting it, for instance from drops and scratches.

Particularly, in certain embodiments, the protective enclosure can be a case for encasing an electronic device, such as a mobile phone, smartphone, tablet computer, personal digital assistant, camera, GPS tracker, health monitor, medical device, or the like. In other instances, the protective enclosure can be part of the electronic device, which protects the various components and/or electronic circuitry of the electronic device. For example, the protective enclosure can be the housing of a mobile electronic device, or smartphone or medical device, which encases the electronic components of the electronic device.

There are several advantages with the protective enclosure provided herein. In certain exemplary instances, a protective enclosure can provide a measure of shock absorbance for the electronic device housed within the protective enclosure. The protective enclosure can also provide protection against scratching, chipping, breaking, fracturing, and the like of the electronic device and/or a touch screen associated therewith, when housed within the protective enclosure. Another advantage of the protective enclosure provided herein is that, in various particular embodiments, it may be a one-piece assembly, although in other embodiments it may be a multi-part assembly that has been engineered to easily fit together thereby making assembly easy. This overcomes the difficulties of some protective enclosures, or cases, for electronic devices that have multiple components and/or are difficult to assemble and can be confusing and difficult to use.

It is to be understood that although particular embodiments are presented herein, such as a protective enclosure for an electronic device, the electronic device comprising a mobile phone, tablet computer, electronic reader, camera or the like, the device housed may be any number of different shapes, sizes, and configurations, and as such, the herein disclosed enclosures can be of any number of different shapes, sizes, and configurations without departing from the nature of the disclosure. For instance, as herein depicted below, and in references to the appended figures, the protective enclosure may include top portions, such as frame members, and top wall portions, such as walls extending below a surface of a top portion surface, such as substantially normal or at an angle thereto; as well as bottom portions and/or bottom wall portions, such as walls extending above a surface of a bottom portion, e.g., substantially normal or at an angle thereto, and may as well include side portions and perimeter portions, all of which may be configured so that the protective enclosure of the disclosure may be formfitting to the device it is designed to protect. In certain instances, the protective enclosure can be configured so as not to need, and in various instances, does not have any one of the portions or wall portions listed above or a combination of one or more of the portions listed above. Hence, the scope of the protective enclosures described herein with respect to the particular embodiments set forth in reference to the figures is not intended to be unduly limiting.

Accordingly, in one aspect, a protective enclosure for an electronic device is provided. Typically, the electronic device may be a device that needs protection from droppage and mishandling and/or damage. For instance, the electronic device can be a mobile phone or tablet computer. In other instances, the electronic device can also be a digital assistant, a computer, a camera, music player, GPS device, or the like. In typical configurations, the electronic device will have a front surface that may include a capacitive sensing touch screen. In some embodiments, the front surface of the electronic device may alternatively or additionally have a keyboard or buttons, e.g., along with a touch screen or other display. The electronic device will have a back surface and together with the front surface the electronic device will be surrounded by a perimeter portion.

Hence, the typical electronic device will have side surfaces, including a top and bottom-side surface and edge as well as opposing side surfaces and respective edges. The side surfaces along with the front surface and bottom surface provide the housing of the electronics, battery, and other components of the electronic device. The front and side surfaces of the electronic device can also have additional features of the electronic device, including buttons and controls and access points. For instance, the electronic device can have buttons and controls that along with the touch screen make the electronic device function fully. The buttons on the electronic device can be a power button, can be volume controls, can be a silencing toggle, and in some instances the buttons can be a keyboard or other controls for enabling the electronic device to function.

As is typical, the electronic device can also have a camera. The camera can be located on a surface of the electronic device and in some instances can be located on the front and/or back surface of the electronic device. The camera can include a flash and in some instances other features might be located near the camera of the electronic device, including a speaker, microphone, or other sensors. The electronic device may also have one or more microphones, for picking up sounds, and/or one or more speakers for transmitting sounds. The microphones and/or speakers can be located on a surface of the electronic device and in some instances can be located along a perimeter surface of the electronic device and on a bottom surface of the electronic device. The electronic device can also have accessible areas for power connections and for headphone connections. These areas can be located along a surface of the electronic device and in some instances be located on the bottom surface of the electronic device. Accordingly, in various instances, as described herein, the protective enclosures of the disclosure may have various features and configurations, such as cut-outs and/or expanded flexible regions that may be configured to accommodate such features, such as control and/or sound transmission features, of the underlying device to be enclosed, so as to ensure the complete functionality of the electronic device, such as while within the case.

Hence, the protective enclosure is configured such that the electronic device can fit within the protective enclosure and be protected from drops, shocks, damage, misuse, and the like, while also, in many cases, allowing full operation of the various features, as described above, of the encased electronic device.

The details of one or more variations of the subject matter described herein are set forth in the accompanying drawings and the following description. As can be seen with respect to FIGS. 1-7 illustrate one embodiment 100 that can include a one-piece multi-layered case that retains and houses an electronic device. As can be seen with respect to FIG. 8 and FIG. 9, the protective enclosure is one embodiment 900 that can include a one-piece multi-layered case that retains and houses an electronic device.

It is to be understood that although particular embodiments are presented herein, such as a protective enclosure for an electronic device, the electronic device comprising a mobile phone, tablet computer, electronic reader, camera or the like, the device housed may be any number of different shapes, sizes, and configurations without departing from the nature of the disclosure. For instance, as herein depicted below, the protective enclosure may include top portions and top wall portions, bottom portions and bottom wall portions, side portions and perimeter portions. In certain instances, (not shown) the protective enclosure cannot have any one of the portions or wall portions listed above or a combination of one or more of the portions listed above. Hence, the scope of the protective enclosures described herein with respect to the particular embodiments set forth in reference to the figures in not intended to be unduly limiting.

Figure 7:
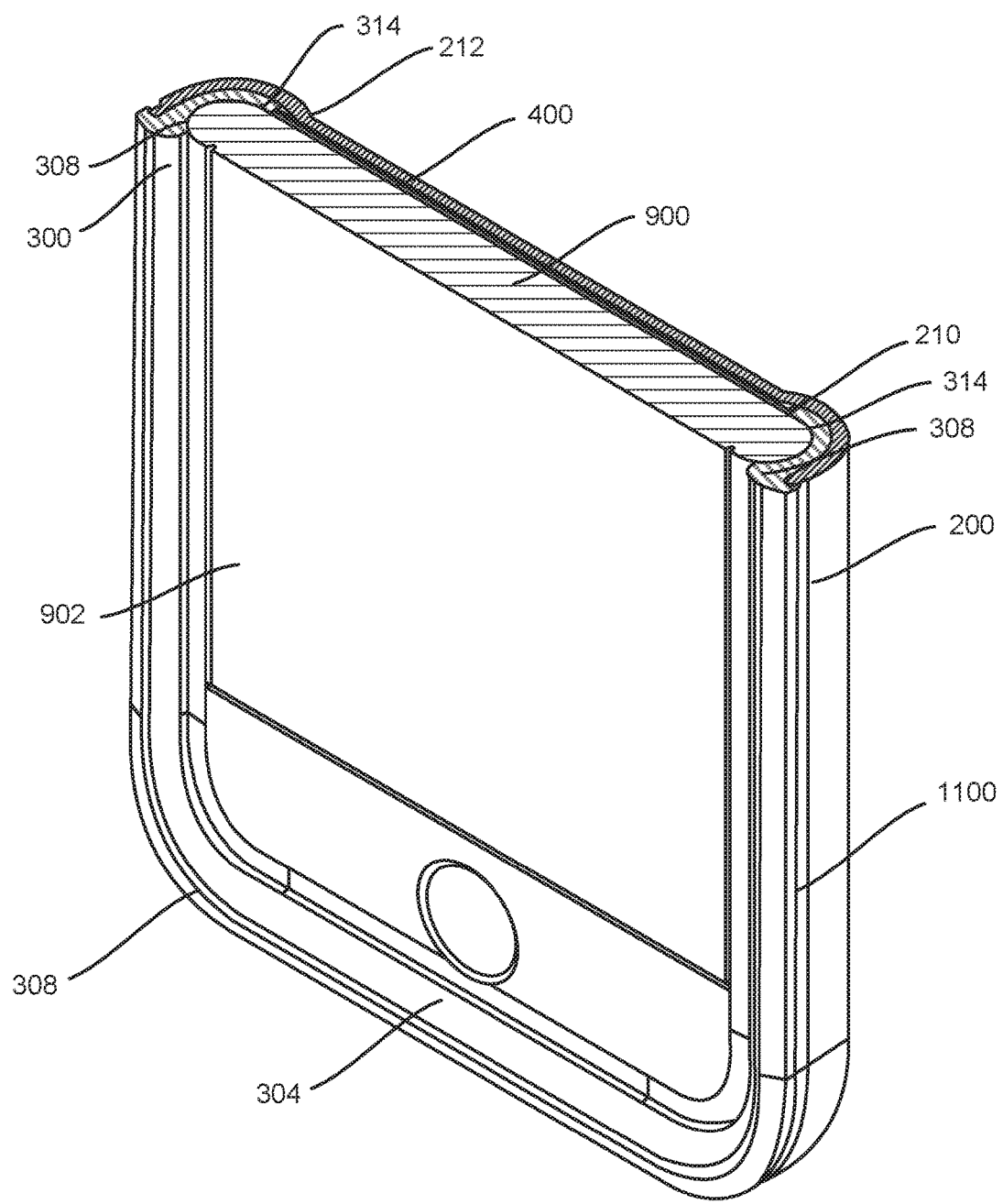
FIG. 7 is a section view of a front isometric view of a protective enclosure for an electronic device.

Accordingly, with respect to FIG. 1, embodiment 100 discloses protective enclosure 102 for electronic device 900 (shown in FIG. 7). Protective enclosure 102 can include structural member 200 overmolded with cushioning member 300. Cushioning member 300 and structural member 200 can be overmolded to form protective enclosure 102 that form-fits to surround electronic device 900.

Figure 2:
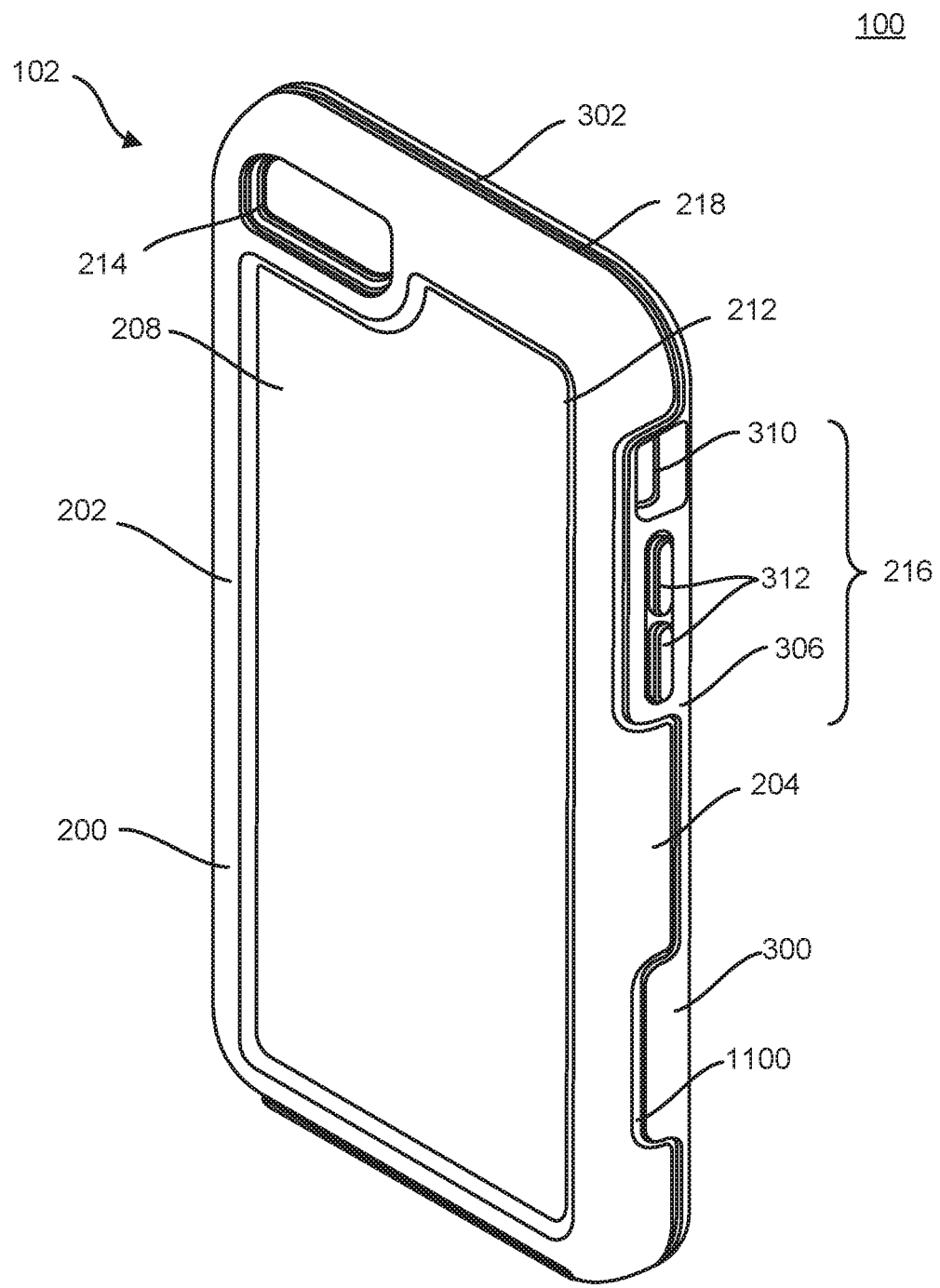
FIG. 2 is a rear isometric view of a protective enclosure for an electronic device.
Figure 3:
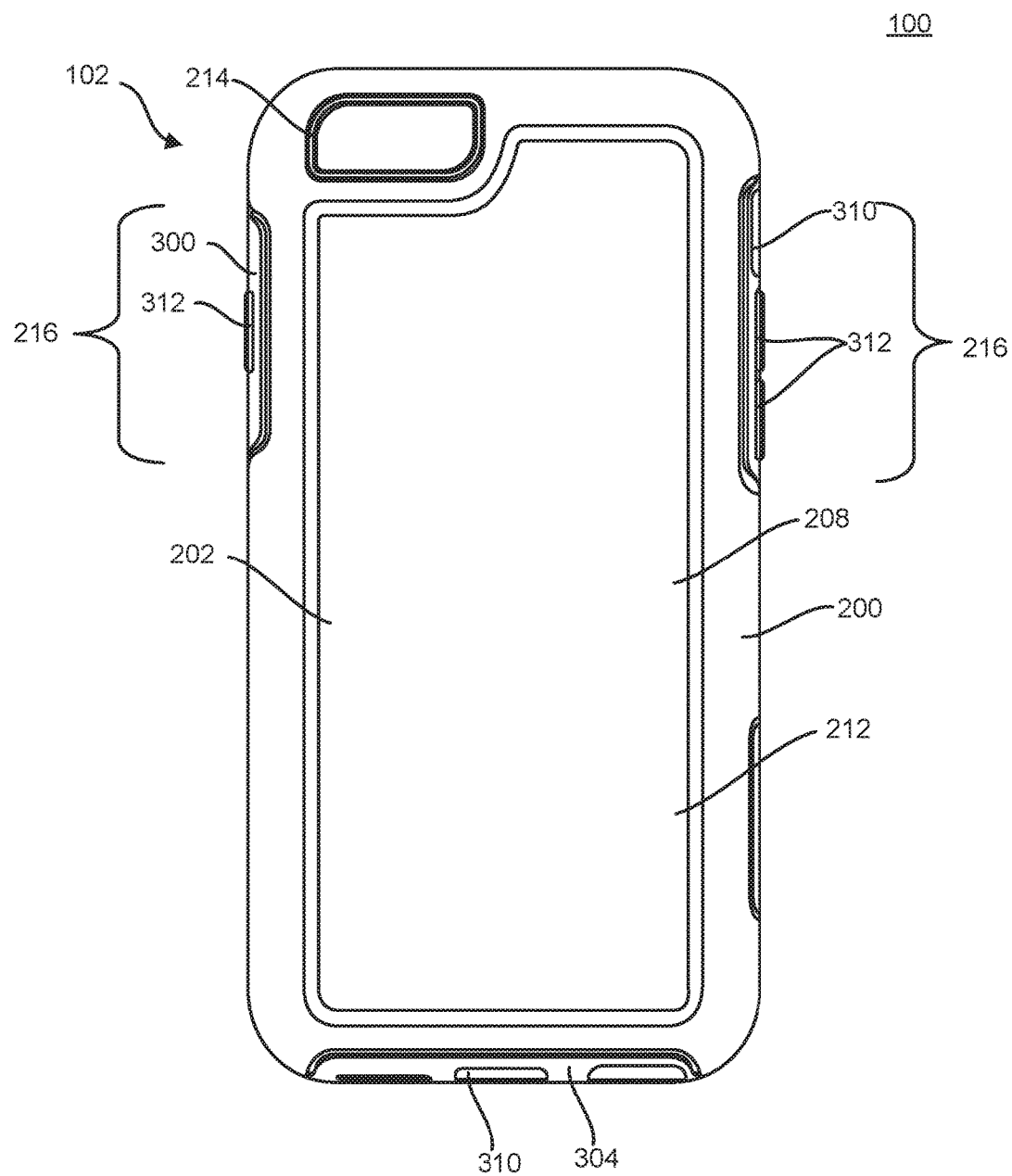
FIG. 3 is a rear view of a protective enclosure for an electronic device.

As can be seen in FIG. 1, FIG. 2 and FIG. 3, structural member 200 can have back portion 202 and side portions 204. Structural member 200 can also be referred to as a structural component, a structural layer, a structural shell or a shell of the protective enclosure. In some instances, the structural member can also be referred to as a back portion, a back frame, or a back component. Side portions 204 of structural member 200 can also be referred to as wall portions, side walls, or in some instances a retaining wall. The shape and height of side portions 204 can vary, but can extend along the shape of the installed electronic device to house the electronic device within structural member 200. In some instances, side portions 204 can extend along the top surface of the electronic device, the bottom surface of the electronic device, or the left and right or side surfaces of the electronic device. The transition between back portion 202 to side portions 204 of structural member 200 can be an edge or a smooth transition.

Back portion 202 of structural member 200 can have inner surface 206 and outer surface 208. Inner surface 206 can have first cavity 210. First cavity 210 in some instances can be shaped to be inset a distance from back portion 202 of structural member 200. First cavity 210 can have a depth that extends away from inner surface 206 of the back portion 202 of the structural member 200 but does not have a depth that extends to the outer surface 208. In some instances, the first cavity 210 of the back portion 202 can be shaped to fit around any functional features of the electronic device, including a camera, a flash, or other functional features of the electronic device 900 and stay inset a distance from the perimeter portion 218 of the back portion 202 of the structural member 200.

As illustrated in FIG. 2, back portion 202 of structural member 200 can have second cavity 212 on outer surface 208 of back portion 202. In some instances, second cavity 212 can have a same shape as first cavity 210 of structural member 200. In some instances, second cavity 212 can have a depth that extends into back portion 202 of structural member 200. In some instances, structural member 200 can have both first cavity 210 and second cavity 212. In this instance, first cavity 210 and second cavity 212 both have depths into back portion 202 of structural member 200 from their respective sides, but the depths of first cavity 210 and second cavity 212 still allow for material of back portion 202 to cover back surface 202 of electronic device 900. In other instances, structural member 200 may have only one cavity, either a cavity located on inner surface 206 of back portion 202 or a cavity located on outer surface 208 of back portion 202 of structural member 200.

In some instances, second cavity 212 of structural member 200 can assist to ensure that the portion of outer surface 208 that is within second cavity 212 of protective enclosure 102 does not get scratched or get damaged when protective enclosure 102 is resting on back portion 202 of structural member 200. In certain instances when structural member 202 can be a transparent material of protective enclosure 102, second cavity 212 can reduce these scratches and damage to back portion 202 of structural member 200 so that installed electronic device 900 can be more clearly seen through protective enclosure 102. In even other instances when removable insert card 400 or other card or paper can be inserted into protective enclosure 102 between inner surface 206 of structural member 200 and the back surface of the electronic device 900, second cavity 212 can reduce the amount of scratches or damage to back portion 202 of structural member 200 in order to more clearly see removable insert card 400.

The material used to create and form structural member 200 can be any suitable material such as a thermoplastic polymer or a synthetic polymer. Structural member 200 can include polycarbonate, nylon, or glass filled nylon. Alternately, any other material, or combination of materials, that provide rigidity to protective enclosure 102 can be used. Structural member 200 can be formed using any suitable process, such as an injection molding process. The material used to form structural member 200 can be scratch-resistant.

Structural member 200 can be a transparent component of protective enclosure 102. In other instances, structural member 200 can be a semi-transparent component. In other instances, back portion 202 of structural member 200 can be transparent while side portions 204 can be a solid color or material. And even other instances, structural member 200 can be transparent and have a textured or decorative element to the surfaces of structural member. In some instances, structural member 200 can be transparent so that a user of protective enclosure 102 can see insert card 400 (discussed in greater detail with respect to FIG. 4) that is installed between the back surface of electronic device 900 and inner surface 206 of structural member 200 from the outside of protective enclosure 102 when looking at back portion 202 of structural member 200. In other instances, structural member 200 can be transparent in order to see the back surface of electronic device 900 through back portion 202 of structural member 200 when electronic device 900 is installed in protective enclosure 102.

Structural member 200 can have cutout regions 216 in one or more of side portions 204. Cutout regions can also be referred to as gaps or cutouts of structural member 200. Cutout region or regions 216 can span a distance along side portion or portions 204. In some instances, cutout regions 216 can be located anywhere along side portion or portions 204 of structural member that cover side surfaces 204 or left and right surfaces of the electronic device. Cutout regions 216 on side surfaces 204 can be located on each side portion of structural member 200 and can be located in the same location with respect to each other or can be offset form each other on opposing side portions 204.

In some instances, cutout regions 216 of structural member 200 can assist in bending of protective enclosure 102 in order to more easily install or remove an electronic device 900 from protective enclosure 102. In some instances, cutout regions 216 of structural member 200 allow protective enclosure 102 to bend towards back portion 202 allowing a top portion of electronic device 900 to be exposed and removed from protective enclosure 102. In other instances, cutout regions 216 can be configured to allow a bottom portion of electronic device 900 to be exposed and removed from protective enclosure 102.

Cushioning member 300 can have top section 302, bottom section 304, and side section or side sections 306. Top section 302 can cover and cushion a top surface of electronic device 900. Bottom section 304 can cover and cushion a bottom surface of electronic device 900. Side section or sides sections 306 of cushioning member 300 can cover and cushion the left side surface and/or right side surface of installed electronic device 900. Cushioning member 300 can also be referred to as a cushioning component, a cushioning layer, a cushioning section, or a cushioning portion. In other instances, cushioning member 300 can be referred to as a perimeter member of the protective enclosure, or a framework member of protective enclosure 102.

Cushioning member 300 can be made of any suitable material such as an elastomer. The elastomer can be a thermoplastic elastomer or silicone rubber. In one embodiment, cushioning member 300 can be overmolded within structural member 200 and form-fit to the dimensions and size of electronic device 900. Cushioning member 300 can be overmolded within two or more portions of structural member 200 and in one embodiment can define the entire cavity between structural member 200 and electronic device 900.

Cushioning member 300 can be overmolded within structural 200 and extend across cutout regions 216 in side portion or side portions 204 of structural layer 200. This can define an area of protective enclosure 102 where cushioning member 300 is the only part of protective enclosure 102 covering electronic device 900 and can act as a flexible portion of protective enclosure 102 for easy insertion and removal of electronic device 900 from protective enclosure 102. In some instances, the cushioning member 300 can be co-molded within the structural member 200 and in other instances the cushioning member 300 can be adhered to the structural member 200 with adhesive or other permanent connection method such as ultrasonic welding.

From the overmolded construction of structural member 200 and cushioning member 300, protective enclosure 102 provides a one-piece construction that functions like, and provides benefits similar to, a more complex two-piece or three piece construction. Protective enclosure 102 provides a soft surface against electronic device 900 with cushioning member 300 and also provides rigidity with structural member 200 to protect against impacts and to give protective enclosure 102 a smooth feel. Structural member 200 and cushioning member 300 can be manufactured in a number of variations of color combinations. In one embodiment, with structural member 200 being transparent, the color of cushioning member 300 can show through the overmolding with structural member 200.

Structural member 200 and cushioning member 300 can have the same thickness throughout protective enclosure 102 and in other embodiments can vary in thickness. This thickness can vary depending on the manufacturing process and design of protective enclosure 102.

Top section 302, bottom section 304, and side section or side sections 306 of cushioning member 300 can provide an upper edge 308 of cushioning member 300 of protective enclosure 102. Upper edge 308 can also be referred to as a raised edge or a raised beveled edge, and in other instances can be referred to as a protective rim or an elevated protective rim. In even other instances, upper edge 308 can be referred to as an upper ledge or an upper ridge. Upper edge 308 of cushioning member 300 can extend from the side surfaces of electronic device 900 away from the back surface of electronic device 900 and beyond front surface 902 of the electronic device 900. When electronic device 900 is installed into protective enclosure 102, this upper edge 308 or protective rim can assist in protecting the touch screen on front surface 902 of electronic device 900 from scratches or drops. When protective enclosure 102 with electronic device 900 installed is resting on front surface 902 of electronic device 900, protective rim 308 allows for front surface 902 of electronic device 900 to not touch whatever flat, or nearly flat, surface protective enclosure 102 is set on, therefore protecting the touch screen and front surface 902 of electronic device 900 from getting scratched or damaged. In other embodiments, the upper edge can be a sectional edge, formed by a combination of the side sections 306 of cushioning member 300. In even other embodiments, the upper edge or protective rim can be formed from the structural layer to protect the front surface of the electronic device.

Cushioning member 300 can also have second protective rim 314 as illustrated in FIG. 7. Second protective rim 314 can be extend along the side surfaces of electronic device 900 to beyond the back surface of electronic device 900. Second protective rim 314 can also be referred to as a second lower edge or a second raised edge of protective enclosure 102. In other instances, the second lower edge can be referred to as a second ledge or second ridge. Second protective rim 314 can protect the back surface of installed electronic device 900 and any functional features located on the back surface such as a camera or flash or speaker. In some instances, second protective rim 314 can protect the back surface of electronic device 900 from inner surface 206 of back portion 202 of structural member 200 when structural member 200 is overmolded around second protective rim 314 of cushioning member 300.

In some instances, second protective rim 314 of cushioning layer 300 can be designed to create a gap or a space between the back surface of electronic device 900 and inner surface 206 of back portion 202 of structural member 200. The gap created with second protective rim 314 can keep the back surface of electronic device 900 from touching inner surface 206 of structural member 200 and protect back surface of electronic device 900 from scuffs, rub marks, and abrasion of the electronic device in case any fine dust, dirt or sand has gotten into protective enclosure 102 while electronic device 900 is installed in protective enclosure 102. In other instances, this gap or space between the back surface of electronic device 900 and inner surface 206 of back portion 202 of structural member 200 can allow for insert card 400 to be installed within protective enclosure 102. In some instances, when insert card 400 is installed in protective enclosure 102, the gap or space between the back surface of electronic device 900 and insert card 400 can still exist.

Figure 4:
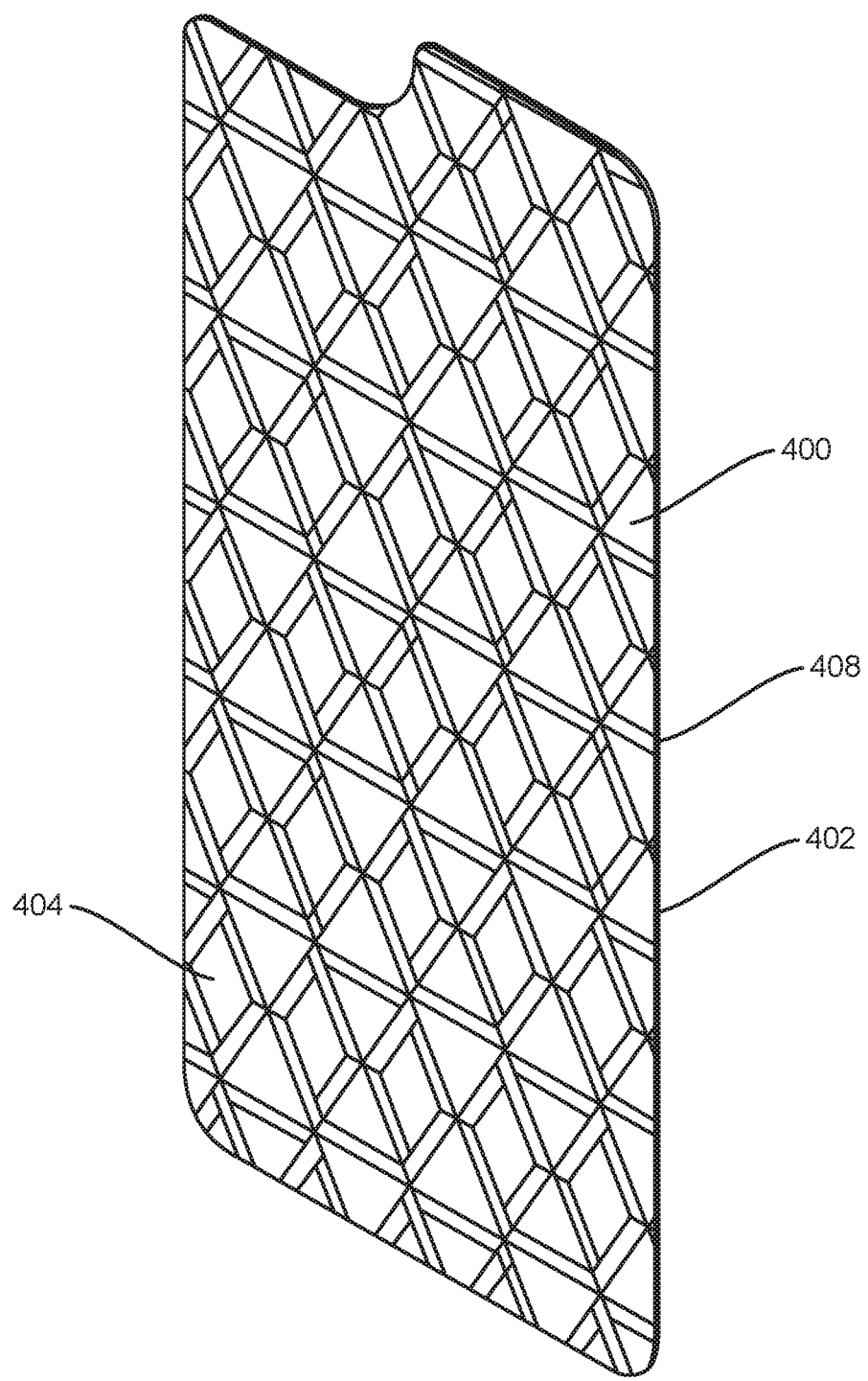
FIG. 4 is rear isometric view of an insert card for a protective enclosure.

Protective enclosure 102 can include insert card 400. Insert card 400 can also be referred to as a decorative insert card or a placard. As shown in FIG. 4, insert card can have shape 402. In some instances, shape 402 of insert card 400 can be the same as the shape of first cavity 210 of structural member 200 such that the insert card can rest within first cavity 210 of structural member 200 when insert card 400 is installed into protective enclosure 102. In some instances, insert card 400 can remain in place within first cavity 210 of structural member 200 when electronic device 900 is installed into protective enclosure 102 and the back surface of electronic device 900 keeps insert card 400 installed in place within first cavity 210 of back portion 202 of structural member 200. In the instances where structural member 200 is transparent, installed insert card 400 can then be seen through back portion 202 of structural member 200 and can be seen from the outside of protective enclosure 102.

Insert card 400 can be made of any suitable material and in some instances can be made of a flexible plastic. In other instances, insert card 400 can be made of paper or plastic-lined paper to add some rigidity to the card. And in other instances, insert card 400 can be made of wood, metal, or another material. Insert card 400 can be decorative in some instances and have patterns or colors printed on one or more surfaces of insert card 400. In some instances, insert card 400 can have an outer surface 404 that is decorative or can have a color. Insert card 400 can have an inner surface with either decorative pattern or color or in some instances can include manufacturing information, company information, or other information printed on the inner surface of insert card 400.

Figure 5:
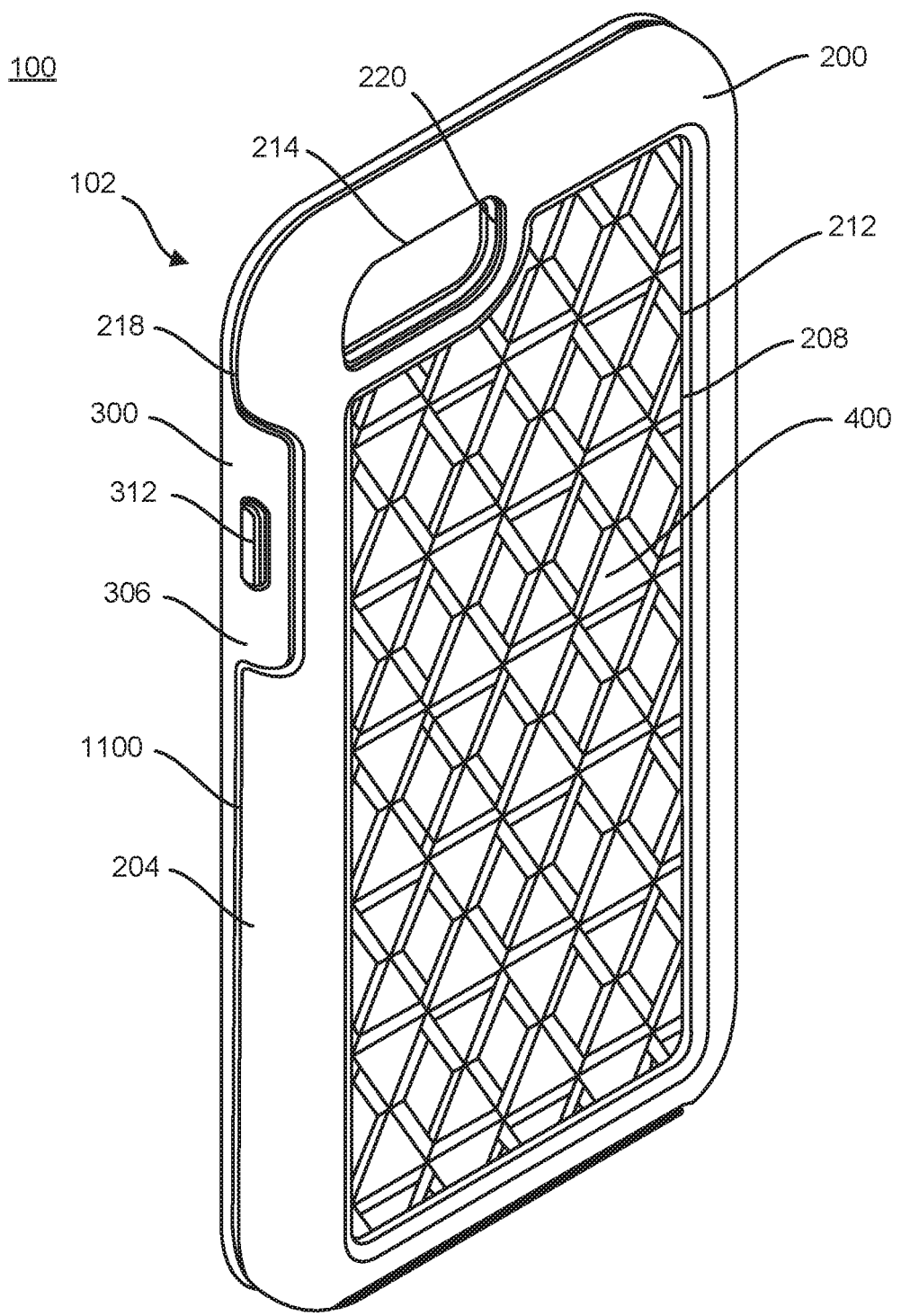
FIG. 5 is a rear isometric view of a protective enclosure for an electronic device.

As shown in FIG. 5, in some instances when insert card 400 is installed into protective enclosure 102, it is installed between the back surface of electronic device 900 and inner surface 206 of back portion 202 of structural member 200. When installed, outer surface 404 of insert card 400 can be seen through back portion 202 of structural member 200 of protective enclosure 102. The decorative pattern or color of outer surface 404 can be seen through protective enclosure 102, providing the fashion or stylistic aspect of protective enclosure 102 that a user might want, along with the protective aspect from drops and falls and scratches that the one-piece protective enclosure provides to electronic device 900.

Figure 6:
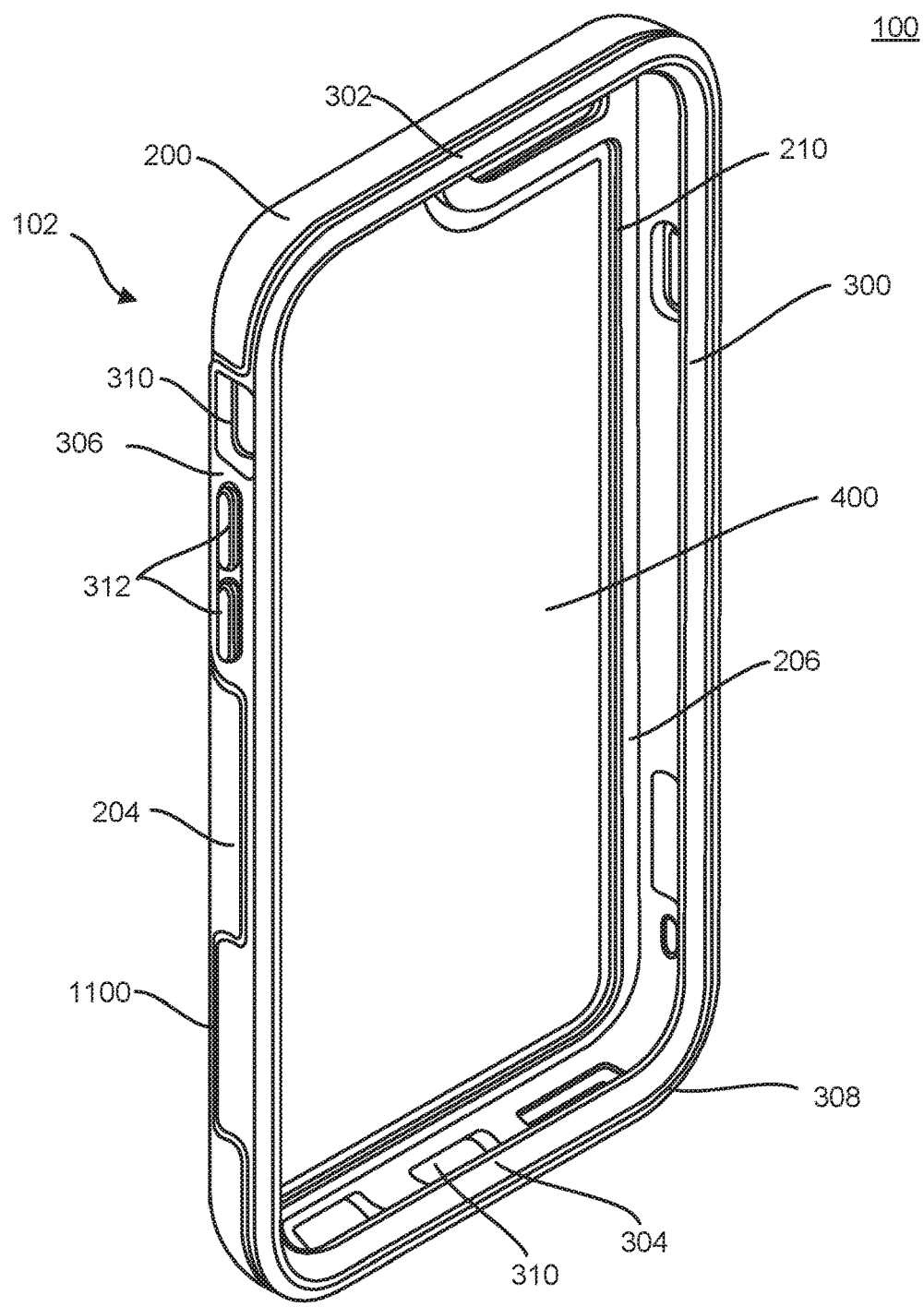
FIG. 6 is a front isometric view of a protective enclosure for an electronic device.

As shown in FIG. 6, insert card 400 can have shape 402 that is similar to first cavity 210 of structural member 200, allowing for insert card 400 to rest within first cavity 210. In other instances, insert card 400 can rest against inner surface 206 of structural member 200, whether or not back portion 202 of structural member 200 has a first cavity. Insert card 400 can also have shape 402 that avoids any functional aspects on the back surface of electronic device 900 which might include a camera, a flash, a speaker, or a microphone. Insert card 400 can have thickness 408. Thickness 408 of insert card 400 can be less than, equal to, or greater than the depth of first cavity 210 of structural member 200 in which the insert is placed within. In some instances when insert card 400 has thickness 408 less than the depth of first cavity 206, more than one insert card 400 could fit within first cavity 210, allowing for multiple cards to be carried along with protective enclosure 102 for easier swapping or changing of insert card 400 that is resting against inner surface 206 of the structural layer and showing through the outer surface 208 of the structural layer 200 of the protective enclosure 102. In other instances when the insert card 400 has a thickness 408 equal to the depth of the first cavity 210, this can create a layer of cushioning for the back surface of the electronic device 900 along when the back surface of the electronic device 900 is installed within the protective enclosure 102.

In other instances, multiple insert cards can be offered to a user of the protective enclosure for swapping out different insert cards with different designs. The removable, swappable insert cards can be different colors or different patterns for night and day use, for seasonal use, or for travel use. The insert cards can have sports team logos printed on them and can be changed out depending on a seasonal sport occurring that the user of the protective enclosure wants to show through the protective enclosure.

In other instances, insert card 400 can be a different type of card from a decorative insert or piece of colored paper or plastic. In some instances, first cavity 210 of structural member 200 can allow for a credit card to be stored within protective enclosure 102. In other instances, an RFID name badge or other access card can be inserted into protective enclosure 102, and structural member 200 being transparent the name badge or access card can be used through transparent back portion 202 of structural member 200 while the badge or access card remain in protective enclosure 102. In yet other instances, a bus pass or subway transportation card can be inserted into protective enclosure 102 and be used through transparent back portion 202 of structural member 200. And in yet other instances, any type of card, image, or information can be inserted into first cavity 210 or rest against inner surface 206 of structural member 200 and be seen through to the outside of protective enclosure 102.

Cushioning member 300 can provide openings 310 for access to features of electronic device 900 that line up with openings 310 of cushioning member 310. In some instances, one or more of the openings may also be referred to as an aperture or port. These features can include power cable access, speaker access, microphone access, and headphone jack access. Openings 310 can be a general opening or can be formed openings to mimic the feature that they are providing access to on electronic device 900 for greater protection of electronic device 900.

Cut out regions 216 of structural member 200 can provide for functional control features 312 of cushioning member 300 for electronic device 900. In the regions where cushioning member 300 covers the side surfaces of electronic device 900 within cutout regions 216 of structural member 200, control features 312 of cushioning member 312 can cover the power button of the electronic device, the volume buttons of the electronic device, or any other functional feature or aspect of the electronic device. In other instances, control features 312 of cushioning member 300 can be referred to as functional coverings or as sound features. Control features 312 can have flexible properties due to the material structure of cushioning member 300 allow for the buttons of electronic device 900 to be accessed and depressed through cushioning member 300 while electronic device 900 is installed in protective enclosure 102.

Structural member 200 can provide camera opening 214 for electronic device 900. Camera opening 214 can mimic the shape of the camera and any associated features of the camera of electronic device 900 or can be a larger opening than the camera and other features. Camera opening 214 of structural member 200 can have a printed surface on surrounding edge 220 that surrounds camera opening 214 and does not hinder the color accuracy of the camera of electronic device 900 when electronic device 900 in installed in protective enclosure 102. In one embodiment, the color of the printed surface on surrounding edge 220 is black and in other instances the finish of the printed surface can have a matte or textured finish for minimizing reflections that the flash of the camera or other external light source might create when trying to utilize the camera feature of electronic device 900 while it is installed in protective enclosure 102. In other embodiments, the printed surface can be other dark colors.

In one embodiment, slot 1100 can be created where the parting area of structural member 200 and cushioning member 300 overmold together to form protective enclosure 102. Slot 1100 can be an area that aids in manufacturing for the overmold to have a clean shutoff region and slot 1100 can hide potential flash created during manufacturing. Slot 1100 can be used as a visual effect for protective enclosure 102 and slot 1100 can also be used as a track for sliding on other accessories or components to protective enclosure 102. Slot 1100 can be formed along any wall portion or perimeter portion of structural member 200 and cushioning member 300. Slot 1100 can also extend for a distance around the perimeter portion and stop, and then start at another location around the perimeter portion of structural layer 200 and cushioning layer 300. Other accessories can include mounts and battery accessories to aid in the use of the electronic device within protective enclosure 102. Slot 1100 can be a thickness and depth of 0.10 in., and can vary in thickness and depth depending on the manufacturing process and design. In other embodiments, the parting area between structural layer 200 and cushioning layer 300 can be a smooth transition.

Figure 8:
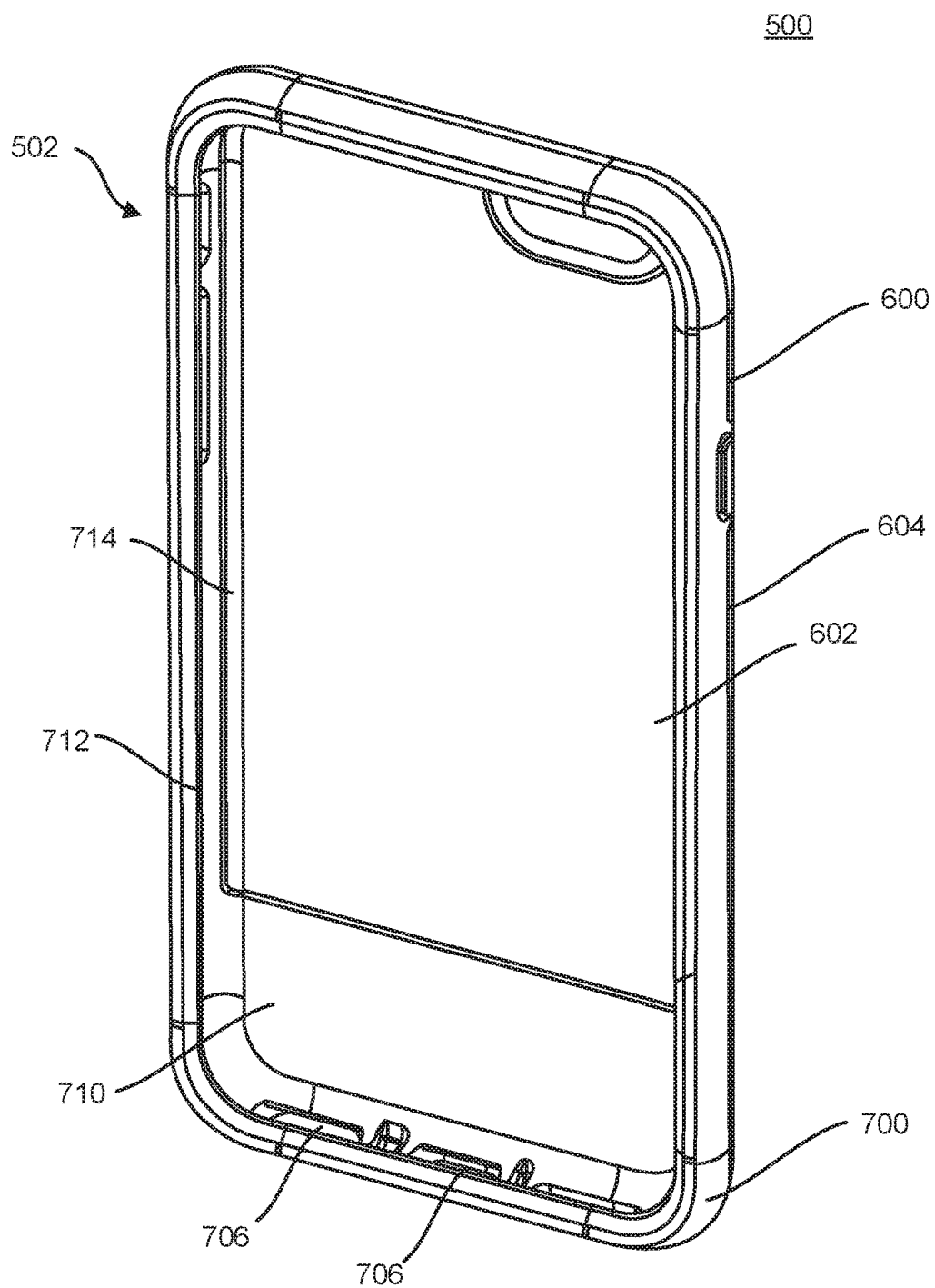
FIG. 8 is a front isometric view of a protective enclosure for an electronic device.
Figure 9:
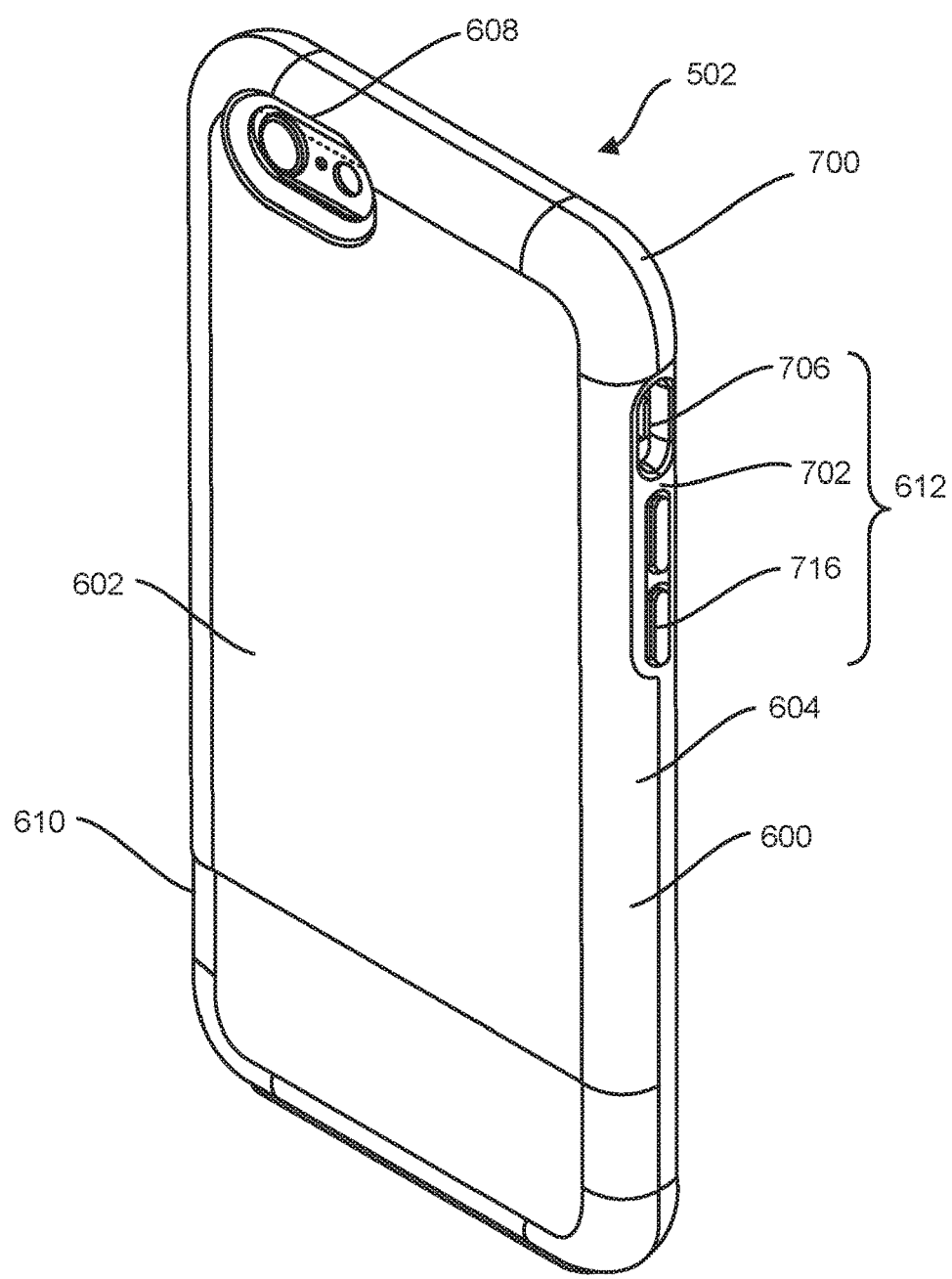
FIG. 9 is a rear isometric view of a protective enclosure for an electronic device.

FIG. 8 and FIG. 9 illustrate enclosure 502. Protective enclosure 502 may have any of the features, elements or functions of enclosure 102. Protective enclosure 502 may include some structural details that differ from protective enclosure 102, as described below.

In embodiment 500 as shown in FIG. 8 and FIG. 9, protective enclosure 502 can have structural layer 600 that may be overmolded with cushioning layer 700. Structural layer 600 can also be referred to a bottom shell. Back portion 602 of structural layer 600 can extend along the back surface of the electronic device. Structural layer 600 can have one or more side portions 604 that extend from back portion 602 of structural layer 600 and cover one or more side surfaces of the electronic device.

Structural layer 600 of protective enclosure 502 can include cutout regions 612 along a side portion or side portions 604 of the protective enclosure. Cutout regions 612 can be located anywhere along side portions 604 of structural layer 600 and in some instances can also be located along a bottom portion or top portion of structural layer 600.

In some instances, structural layer 600 can be a transparent material, so a user can see the surfaces of their electronic device when the electronic device is inserted into protective enclosure 502. In other instances, structural layer 600 can also be a colored material or can be semi-transparent.

Cushioning layer 700 of protective enclosure 502 can be overmolded with structural layer 600. Cushioning layer 700 can also be referred to as a bumper portion, perimeter cushioning member, or a perimeter bumper cushioning frame. Cushioning layer 700 can cover and surround the side surfaces of the electronic device. The side surfaces and front and back surfaces of the electronic device can create edges of the electronic device. These edges can be referred to as a front edge and a back edge, or a first edge and a second edge. Cushioning layer 700 can include outer protective rim 712 that extends from the side surface or side surfaces of the electronic device to beyond a front surface of the electronic device. Outer protective rim 712 can also be referred to as a first raised edge or front raised edge. Outer protective rim 712 can extend around the front edge of the installed electronic device. Outer protective rim 712 can extend beyond the front surface of the electronic device to protect the front surface of the electronic device from scratches and potential drops onto the front surface. Outer protective rim 712 can include a beveled edge that touches the front surface of the electronic device.

Cushioning layer 700 can also include inner protective rim 714. Inner protective rim 714 can also be referred to as a second raised edge or a back raised edge. Inner protective rim 714 can extend beyond the side surface or side surfaces of the electronic device and extend beyond the back surface of the electronic device. Inner protective rim 714 can extend around the back edge of the installed electronic device. Inner protective rim 714 can protect the back surface of the electronic device from touching back portion 602 of structural layer 600 of protective enclosure 502. Inner protective rim 714 can be configured to form a gap between the inner surface of structural member 600 and the back surface of the electronic device. Inner protective rim 714 of cushioning layer 700 can be overmolded with structural layer 600 such that back portion 602 of structural layer is located over and around inner protective rim 714 of cushioning layer 700. In some instances, inner protective rim 714 does not cover the back surface of the installed electronic device.

In some instances, a portion of inner protective rim 714 can extend and wrap around the back surface of the electronic device to cushion and cover a portion of the back surface of the electronic device. This portion can also be referred to as interior section 710 or an inner component. Interior section 710 can be located anywhere along the back surface of the electronic device and in some instances is located towards the bottom area of the back surface of the electronic device and less than half of the bottom portion of the back surface of the electronic device. Interior section 710 and inner protective rim 714 combined keep the back surface of the electronic device from touching back portion 602 of structural layer 600.

In some instances, cushioning layer 700 can include a back section configured to cover the back surface of the installed electronic device. Back section of cushioning layer 700 can include a cavity, the cavity configured to expose the back surface of the installed electronic device. The cavity can vary in size and in some instances can be the size of the back surface of the installed electronic device, exposing most of or all of the back surface of the electronic device when the electronic device is installed in the protective enclosure.

In some instances, and as seen in FIG. 9, structural layer 600 can include thinned-out section 610 on outer surface of back portion 602 of the structural component 600. Thinned-out section 610 can be located anywhere along the outer surface of back portion 602 of structural layer 600 and in some instances can be located along the bottom area of the back portion. In other instances, thinned-out section 610 of structural layer 600 can be the same size as interior section 710 of cushioning layer 700 to provide a portion of the of protective enclosure 502 to accommodate an accessory component.

In some instances, an accessory component (not shown) can be fitted over thinned-out portion 610 of structural layer 600 for a design or graphic effect on the outside of protective enclosure 502. In some instances, this accessory component can be a strip of leather, a strip of metal, a strip of textured plastic, a strip of fabric, a strip of silicone, or in some instances a strip of a rare metal or material. The accessory component can be shaped to fit within the entire section of thinned-out portion 610 of structural layer 600 or can be shaped to fit a portion of the thinned-out portion. In some instances, the accessory component has a thickness so when it is fitted onto the thinned-out portion, it becomes flush with the remaining portion of back portion 602 of structural layer 600 so that the back of protective enclosure 502 is smooth and there are no steps or obstructions on the back of protective enclosure 502.

Structural layer 600 of protective enclosure 502 can have cut out region 612. Cut out region 612 can also be referred to as cutout or a gap in structural layer 600. Cut out region or more than one cut out region 612 can be located along the side portion or side portions 604 of structural layer 600. Cut out region 612 can comprise the entire height o of the side surfaces of the electronic device or can be a portion of the height of the side surface or side surfaces. Cut out region 612 can extend along the side surface or side surfaces of the electronic device and can include a region of access to volume controls, power controls, and/or silence toggle controls of the electronic device when the electronic device is installed within protective enclosure 502.

In some instances, cutout regions 612 of structural layer 600 can assist in bending of protective enclosure 502 in order to more easily install or remove an electronic device from protective enclosure 502. In some instances, cutout regions 612 of structural layer 600 allow the protective enclosure to bend towards back portion 602 allowing a top portion of the electronic device to be exposed and removed from the protective enclosure. In other instances, cutout regions 612 can be configured to allow a bottom portion of the electronic device to be exposed and removed from protective enclosure 502.

Structural layer 600 can include camera feature 608. Camera feature 608 can be provided on the outer surface of back portion 602 of structural layer 600 and can include a camera opening and an opening for a flash component, a perimeter portion of camera opening 608 extending from the outer surface of back portion 602 to the inner surface of back portion 602 of structural layer 600. In some instances, the perimeter portion extends past the structural layer and makes contact with the back portion of the installed electronic device. The perimeter portion of camera opening 608 can in some instances have a beveled edge, the beveled edge extending away from the camera and flash component of the installed electronic device. The beveled edge can help to reduce any interference to the camera of the electronic device when installed in the protective enclosure. By having the beveled edge extend away from the area in which the camera might capture an image, it reduces any reflection or interference with the image capture. Perimeter portion of camera opening 608 that extends towards the inner surface of the structural layer and makes contact with the installed electronic device can help to prevent dust, debris, or other material from entering the protective enclosure and getting within the gap between structural layer 600 and the back portion of the installed electronic device.

Cushioning layer 700 can include control features 716 for controlling features of the electronic device. Control features 716 of cushioning layer 700 can be located along side sections 702 of cushioning layer 700 and can be located within cutout regions 612 of structural layer 600. Control features 716 can be flexible in order to activate features of the electronic device while the electronic device is installed within protective enclosure 502.

Cushioning layer 700 can also include, in some embodiments, opening or openings 706 along side section or side sections 702 and/or bottom section 704 of cushioning layer 700. Openings 706 can provide access to feature of the installed electronic device, such as a power connection, speakers, silence toggle switch, microphones, or a headphone jack port. Opening or openings 706 can be shaped as the feature of the electronic device that they are covering or can be a larger shape to accommodate multiple features of the electronic device in one opening or openings 706.

A protective enclosure of the disclosure may be of any suitable shape, having any suitable size, dependent on the actual dimensions of the device it is meant to encase. However, in certain exemplary instances, the dimensions of one class of protective enclosure can fall within the following ranges. The thickness of various members, whether individually or when overmolded together, can have a thickness of about 25 mm or less, such as 20 mm or less, for instance, about 15 mm or less, including about 10 mm or less, such as about 8 mm or less, or about 5 mm or less, about 4 mm or less, including about 3 mm or less or about 2 mm or less, for example about 1.5 mm or 1.0 mm or less, even about 0.1 mm. For example, in various instances, such as where an electronic device such as a smartphone, tablet computer, electronic reader, camera, or video display is to be contained within the protective enclosure, the thickness of a top portion and/or bottom portion and any side portions, individually or overmolded together, can be less than about 2.5 mm, such as less than about 2.0 mm, less than about 1.5 mm, for example less than 1 mm thick, even about 0.1 mm thick. However, in other instances, the thickness of various members, whether individually or when overmolded together, can have a thickness of about 30 mm or more, such as 40 mm or more, for instance, about 50 mm or more, including about 60 mm or more, such as about 80 mm or more, or even about 100 mm or more.

In certain instances, such as where an electronic device such as a smartphone, tablet computer, electronic reader, camera, or video display is to be contained within the protective enclosure, the weight of any portion of the protective enclosure, individually or overmolded together, can be less than about 5 or about 4 ounces, less than about 4 or about 3 ounces, for instance, less than about 2 or about 1 ounce, including less than about 28 or about 27 grams. Accordingly, in one embodiment, due to the design features described herein, a protective enclosure can be capable of providing shock and drop protection to an electronic device housed within the protective enclosure while only having a thickness and/or weight range in the recited above. However, in various instances, an enclosure of the disclosure may have a weight and construction that is substantially greater than the above, such as more than about 10 or about 20 ounces, more than about 30 or about 50 ounces, for instance, more than about 60 or about 80 ounce, including more than about 100 ounces.

Further, in certain instances, the length and/or width of the protective enclosure may be such that it is no longer or wider than about 25 mm of the underlying electronic device it is designed to encase, no longer or wider than about 20 mm or about 15 mm, for instance, no longer or wider than about 10 mm, including no longer or wider than about 5 mm of the underlying electronic device the protective enclosure is designed to encase. Accordingly, in certain instances, a protective enclosure is configured to be substantially form fitting with the electronic device it is meant to contain. However, in various instances, an enclosure of the disclosure may be substantially longer or wider than the dimensions listed above, such as, for instance, longer or wider by about 50 mm of the underlying electronic device it is designed to encase, longer or wider by about 75 mm or about 85 mm, for instance, longer or wider by about 100 mm than the underlying electronic device the protective enclosure is designed to encase.

To ensure the appropriate thickness, length, and/or width, and/or weight of the protective enclosure have been provided, the electronic device can be fitted into the protective enclosure and the protective enclosure can be tested for its ability to provide shock and drop protection, such as by experimentally dropping the protective enclosure and electronic device. In some instances, the protective enclosure with the electronic device housed within can be tested to specific drop standards or even military standards in order to comply with certain specifications set forth by the guarantees of the protection that the protective enclosure can provide for the electronic device. The thickness, length, and/or width and/or weight of the protective enclosure should be provided in such dimensions so that the retained electronic device is not broken, cracked, or otherwise damaged by the dropping and testing.

The above figures may depict exemplary configurations for an apparatus of the disclosure, which is done to aid in understanding the features and functionality that can be included in the enclosures described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional", "traditional", "standard", "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more", "at least", "but not limited to" or other like phrases in some instances shall not be read to mean that the narrower case is intended or required in instances where such broadening phrases may be absent. Additionally, where a range is set forth, the upper and lower limitations of the range are inclusive of all of the intermediary units therein.

The foregoing disclosure has been presented for purposes of illustration and description. Other modifications and variations may be possible in view of the above teachings. The embodiments described in the foregoing disclosure were chosen to explain the principles of the invention and its practical application to enable others skilled in the art to best utilize the invention. It is intended that the claims be construed to include other alternative embodiments of the invention except as limited by the prior art.

What is claimed is:

1. A protective enclosure for an electronic device having a front surface, a back surface, and a plurality of side surfaces, the protective enclosure comprising:
   a structural member having a back portion having an inner surface and an outer surface;
   a cushioning member permanently attached to the structural member and including a top section configured to be in direct contact with and cover at least a portion of the front surface of the installed electronic device, a bottom section configured to be in direct contact with and cover at least a portion of the back surface of the installed electronic device, and one or more side sections each configured to cover a respective side of the plurality of side surfaces of the installed electronic device; and
   a gap configured to create a space extending between the inner surface of the back portion and the electronic device when the electronic device is installed in the protective enclosure, wherein the bottom section of the cushioning member includes a lower edge defining a perimeter that bounds the gap.

2. The protective enclosure of claim 1, wherein the cushioning member is overmolded to the structural member to form a one-piece construction.

3. The protective enclosure of claim 1, wherein the structural member further includes a right side portion and a left side portion, each of the right side portion and the left side portion including a cutout region configured to allow the protective enclosure to bend towards the back portion of the structural member to allow a portion of the installed electronic device to be exposed and removed from the protective enclosure.

4. The protective enclosure of claim 3, wherein the cushioning member extends across the cutout region in the right side portion and the cutout region in the left side portion.

5. The protective enclosure of claim 1, wherein the cushioning member includes an interior section configured to cover a portion of the back surface of the installed electronic device.

6. The protective enclosure of claim 1, further comprising a slot extending around at least a portion of a perimeter of the protective enclosure between the structural member and the cushioning member.

7. The protective enclosure of claim 1, wherein the structural member comprises a rigid thermoplastic polymer and the cushioning member comprises a flexible silicone elastomer.

8. A protective enclosure for an electronic device having a front surface with a display and a back surface opposite the front surface, the protective enclosure comprising:
   a cushioning member including an upper edge configured to extend beyond the front surface of the installed electronic device to protect the display of the electronic device when the electronic device is installed in the protective enclosure and a lower edge configured to be in direct contact with and extend beyond the back surface of the installed electronic device; and
   a structural member permanently attached to the cushioning member and configured to cover at least a portion of the back surface of the installed electronic device, the structural member including a plurality of side portions and a back portion having an inner surface and an outer surface;
   wherein the lower edge of the cushioning member is configured to create a space extending between the inner surface of the structural member and the back surface of the installed electronic device, the space bounded by the lower edge of the cushioning member.

9. The protective enclosure of claim 8, wherein the structural member is transparent and a color of the structural member is visible through the structural member.

10. The protective enclosure of claim 8, wherein two of the plurality of side portions of the structural member each include a cutout region configured to allow the protective enclosure to bend towards the back portion of the structural member to allow a portion of the installed electronic device to be exposed and removed from the protective enclosure.

11. The protective enclosure of claim 10, wherein the cushioning member extends across each of the cutout regions.

12. The protective enclosure of claim 8, wherein the cushioning member is overmolded to the structural member to form a one-piece construction, the protective enclosure further comprising a slot between the a side portion of structural member and a side section of the cushioning member.

13. The protective enclosure of claim 12, wherein the slot extends around a perimeter of the protective enclosure.

14. A one-piece protective enclosure for an electronic device having a front surface, a back surface, and a plurality of side surfaces, the protective enclosure comprising:
   a structural member configured to cover at least a portion of the back surface of the installed electronic device, the structural member including a back portion having an inner surface and an outer surface;
   a cushioning member permanently attached to the structural member and including a lower edge configured to extend be in direct contact with and extend beyond the back surface of the installed electronic device; and
   a slot extending around at least a portion of a perimeter of the protective enclosure between the structural member and the cushioning member;

wherein the lower edge of the cushioning member is configured to create a space extending between the inner surface of the structural member and the back surface of the installed electronic device, the space bounded by the lower edge of the cushioning member.

15. The one-piece protective enclosure of claim 14, wherein the cushioning member continuously extends from an upper edge to the lower edge, the upper edge of the cushioning member configured to extend beyond the front surface of the installed electronic device, the cushioning member configured to be in direct contact with at least a portion of the front surface and a portion of the plurality of side surfaces of the installed electronic device.

16. The one-piece protective enclosure of claim 14, wherein the structural member further includes a first side portion and a second side portion opposite the first side portion, each of the first side portion and the second side portion including a cutout region configured to allow the protective enclosure to bend towards the back portion of the structural member to allow a portion of the installed electronic device to be exposed and removed from the protective enclosure.

17. The one-piece protective enclosure of claim 16, wherein the cushioning member extends across each of the cutout regions.

18. The one-piece protective enclosure of claim 16, wherein the cutout region of the first side portion is located opposite the cutout region of the second side portion.

* * * * *